United States Patent [19]
Yoshida

[11] Patent Number: 5,684,606
[45] Date of Patent: Nov. 4, 1997

[54] DATA COMMUNICATION APPARATUS WHICH PROCESSES FIRST AND SECOND COMMUNICATION DATA BASED ON A DETERMINED RELATIONSHIP BETWEEN THE FIRST AND SECOND COMMUNICATION DATA

[75] Inventor: Takehiro Yoshida, Tokyo, Japan

[73] Assignee: Canon Kabushiki Kaisha, Tokyo, Japan

[21] Appl. No.: 619,907

[22] Filed: Mar. 20, 1996

Related U.S. Application Data

[62] Division of Ser. No. 186,990, Jan. 28, 1994.

[30] Foreign Application Priority Data

| Feb. 2, 1993 | [JP] | Japan | 5-015426 |
| Apr. 22, 1993 | [JP] | Japan | 5-095994 |

[51] Int. Cl.$^6$ .................................................. H04N 1/32
[52] U.S. Cl. ...................................... 358/437; 358/440
[58] Field of Search ............................... 358/407, 440, 358/402, 403, 437, 468

[56] References Cited

U.S. PATENT DOCUMENTS

| 4,829,524 | 5/1989 | Yoshida . | |
| 5,031,179 | 7/1991 | Yoshida et al. . | |
| 5,077,742 | 12/1991 | Tsumura et al. | 371/32 |
| 5,084,770 | 1/1992 | Nakayama | 358/440 |
| 5,172,246 | 12/1992 | Yoshida . | |
| 5,220,439 | 6/1993 | Yoshida . | |
| 5,251,043 | 10/1993 | Hamano et al. | 358/402 |
| 5,428,457 | 6/1995 | Okumura et al. | 358/403 |

FOREIGN PATENT DOCUMENTS

| 0198396 | 10/1986 | European Pat. Off. . |
| 0226756 | 7/1987 | European Pat. Off. . |
| 0473162 | 3/1992 | European Pat. Off. . |
| 2648657 | 12/1990 | France . |
| 1-81571 | 3/1989 | Japan . |
| 6481571 | 3/1989 | Japan . |

OTHER PUBLICATIONS

Pat.Abs.Jp., vol. 14, No.374 (E–0964) Aug. 13, 1990 (JP–A–02135864).

Pat.Abs.Jp., vol. 17, No. 65 (E–1317) Feb. 9, 1993 (JP–A–04271566).

Pat.Abs.Jp., vol. 11, No. 108 (E–495) Apr. 4, 1987 (JP–A–61255158).

Pat.Abs.Jp., vol. 16, No. 79 (E–1171) Feb. 26, 1992 (JP–A–03266561).

Pat. Abs. Jp., vol. 11, No. 220 (E–524) Jul. 16, 1987 (JP–A–62038656).

*Primary Examiner*—Scott A. Rogers
*Attorney, Agent, or Firm*—Fitzpatrick, Cella, Harper & Scinto

[57] ABSTRACT

A facsimile apparatus which can resend an error page et seq. when a communication error occurs, wherein a sender notifies a receiver in a pre-procedure that the sender can resend an error page et seq. The receiver does not record data of an error page, or refuses reception except for error-resending from the sender disconnected due to the error for a predetermined period of time. The apparatus has a controller for notifying the receiver that resending of an error page et seq. is performed.

30 Claims, 24 Drawing Sheets

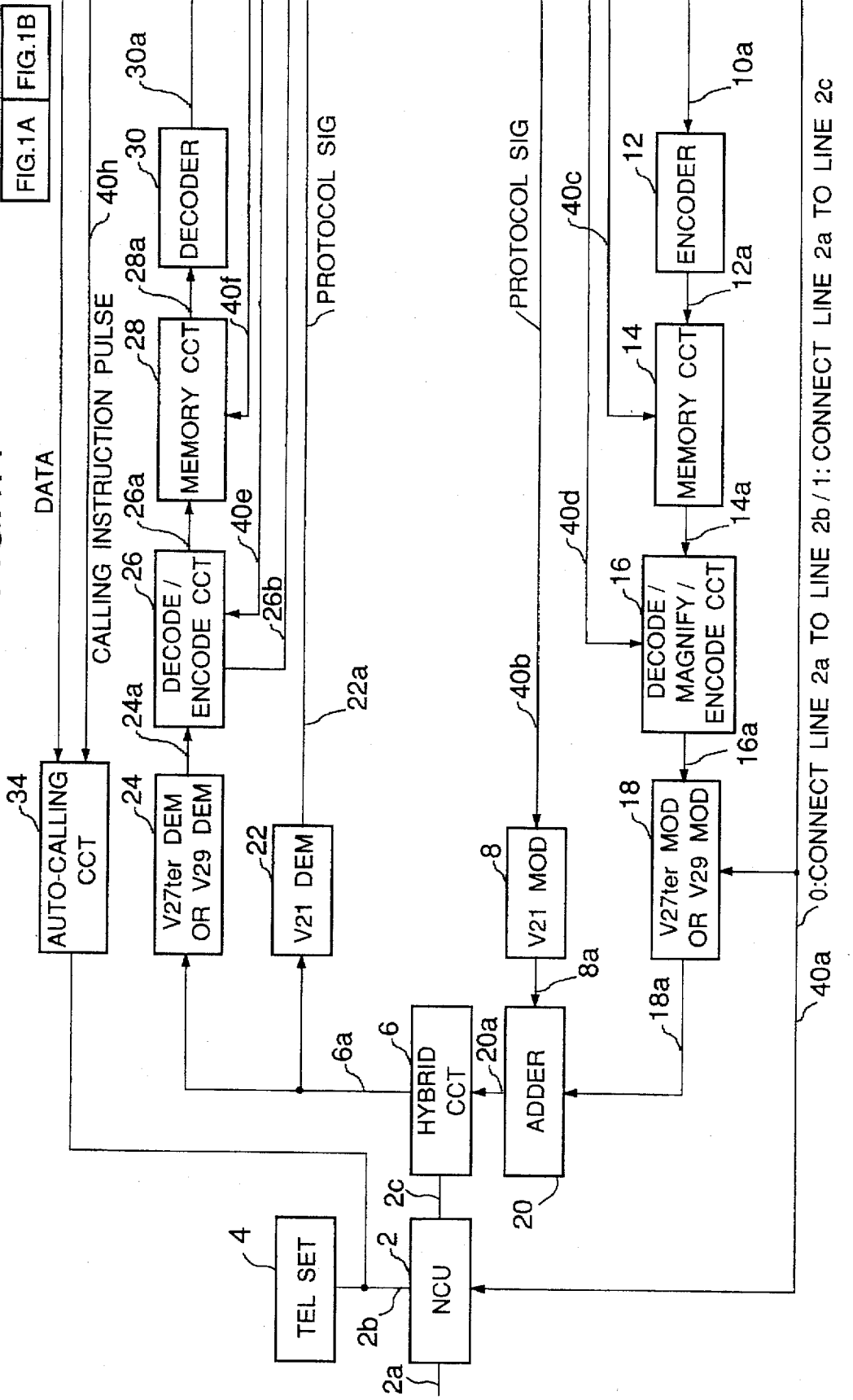

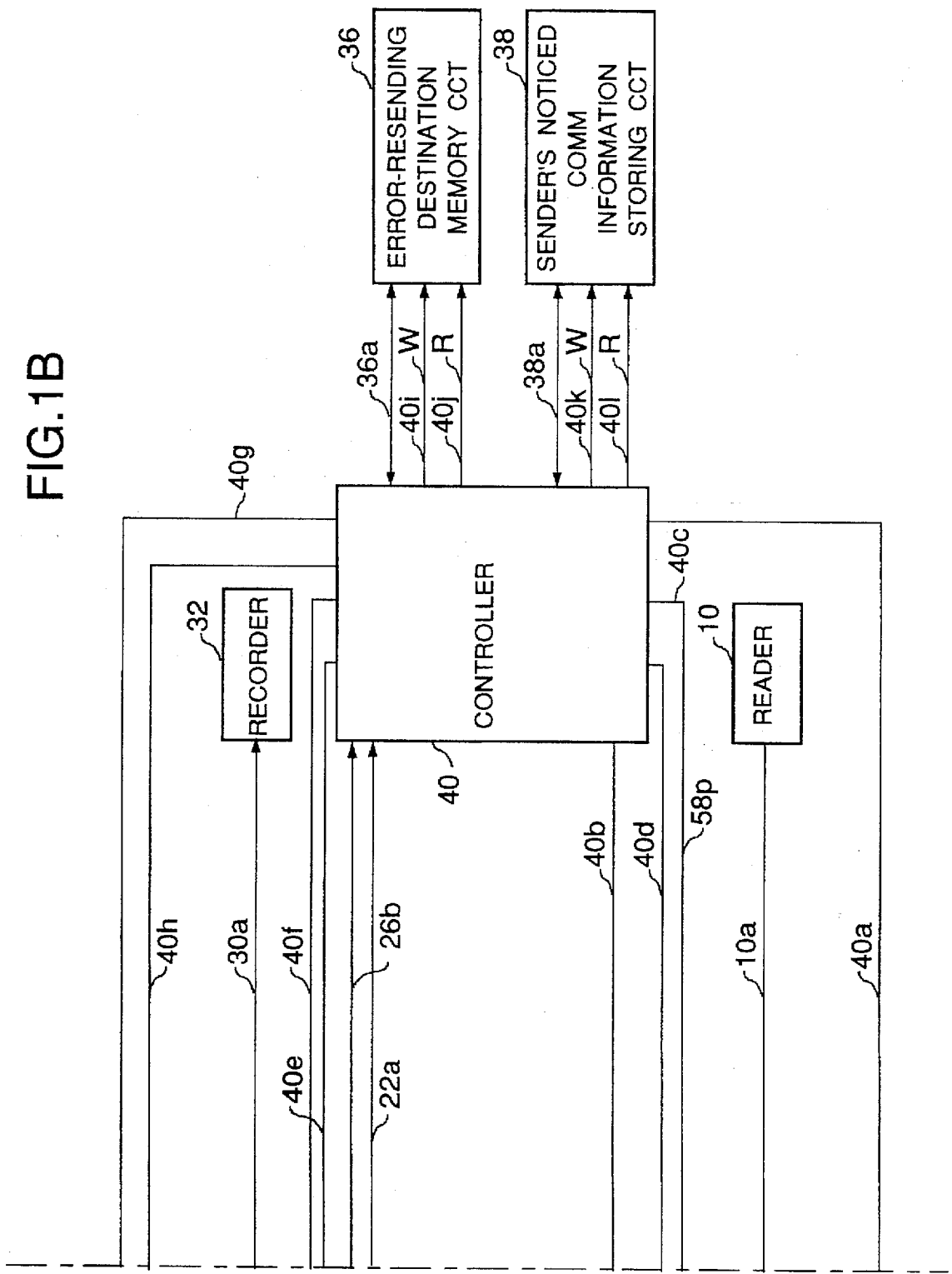

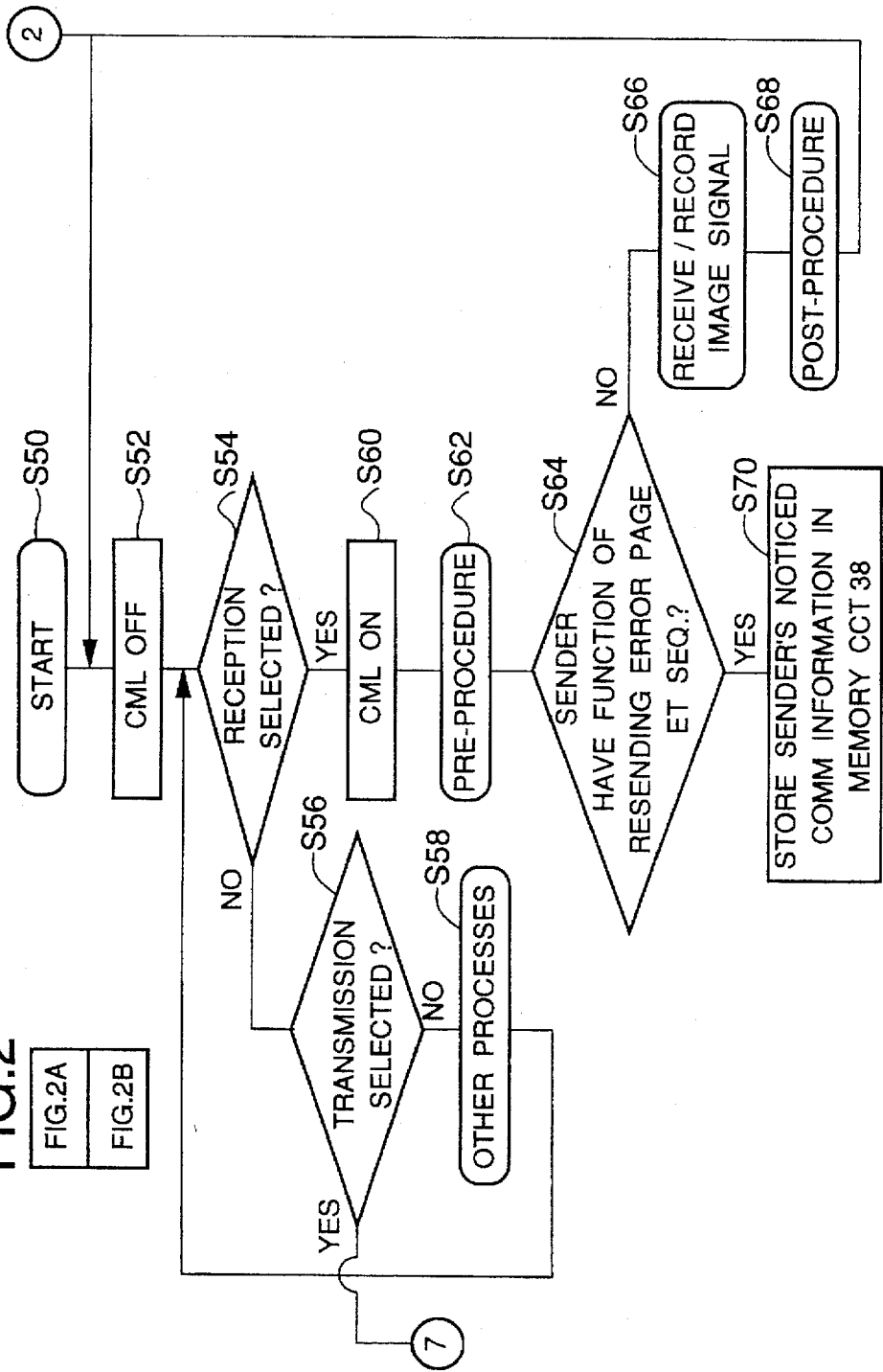

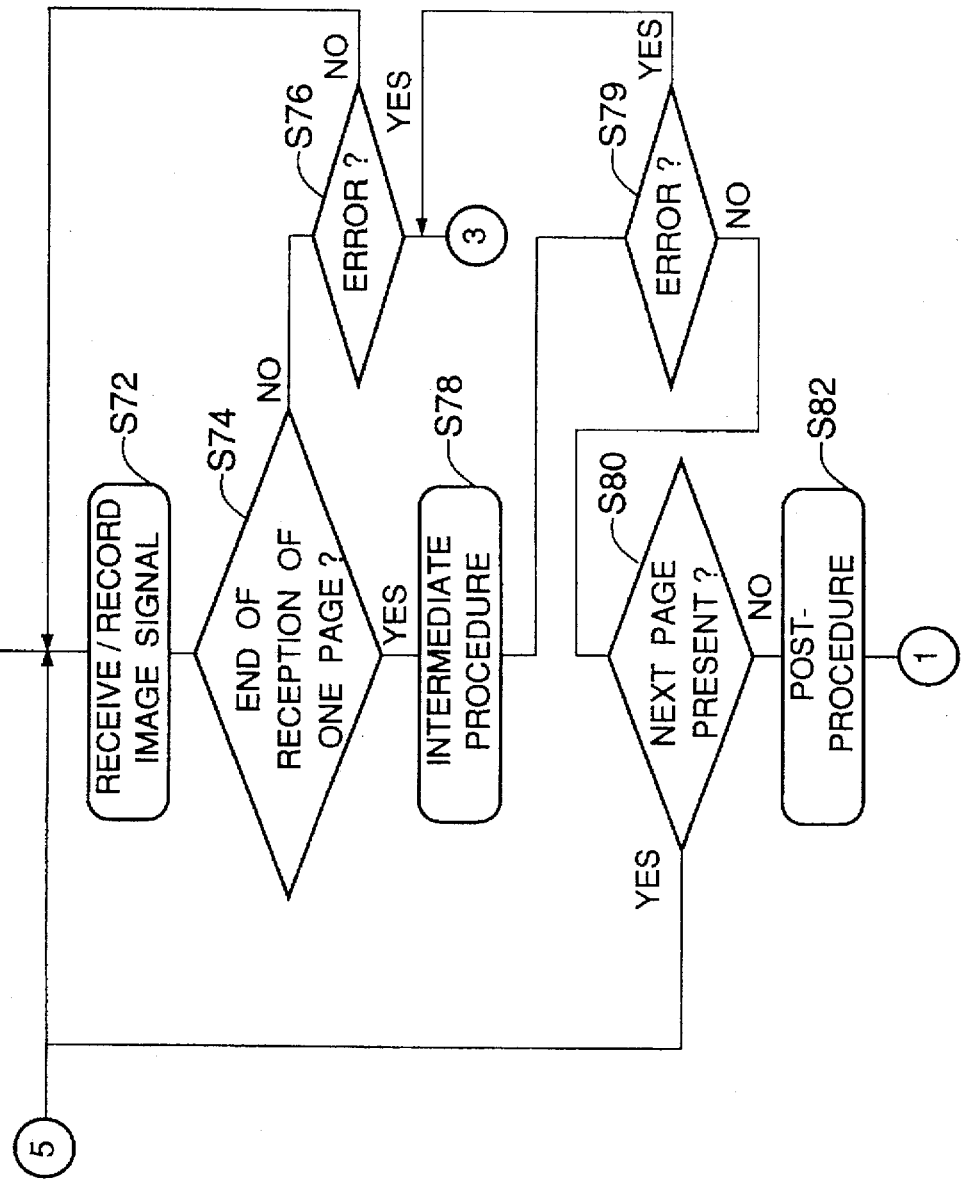

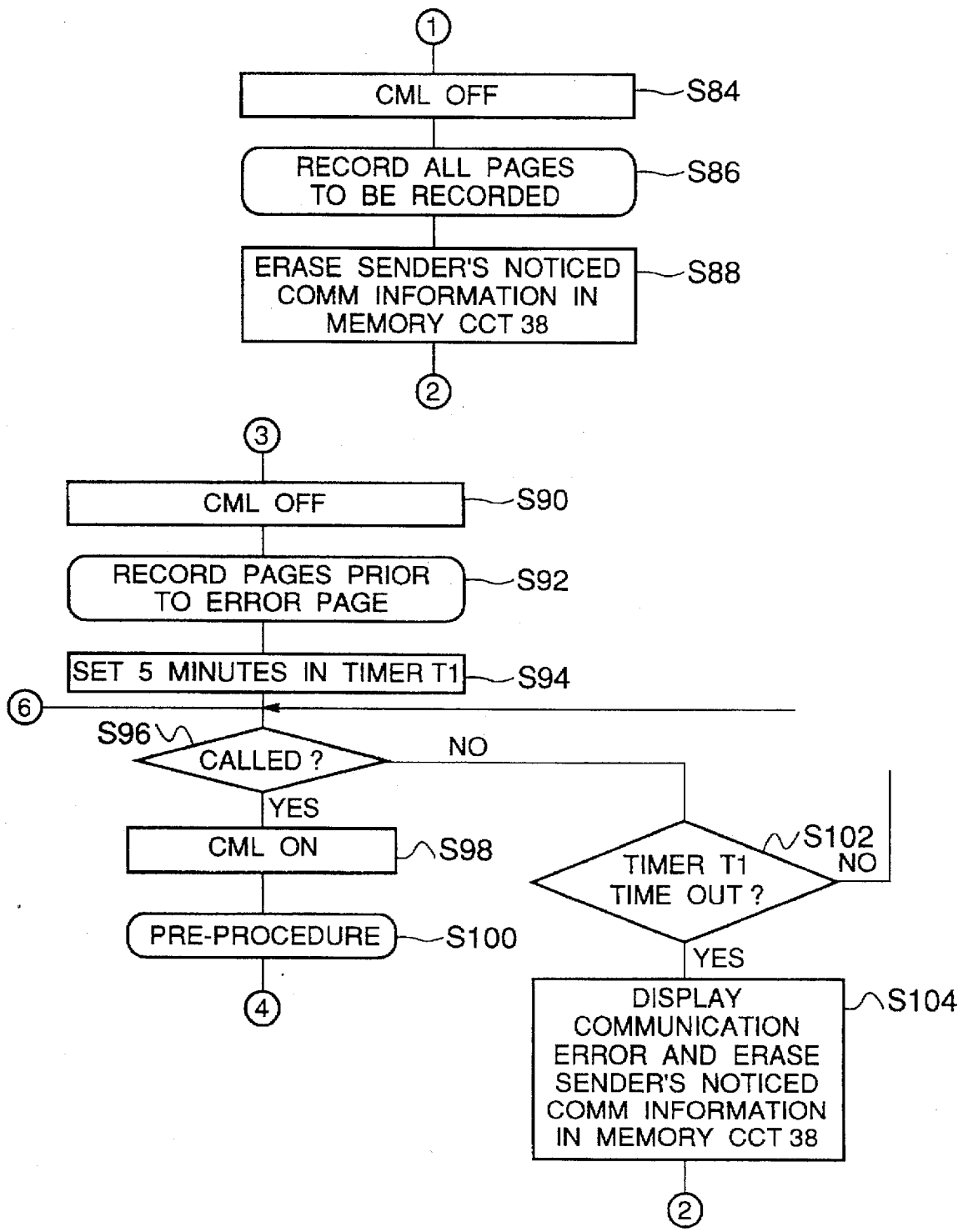

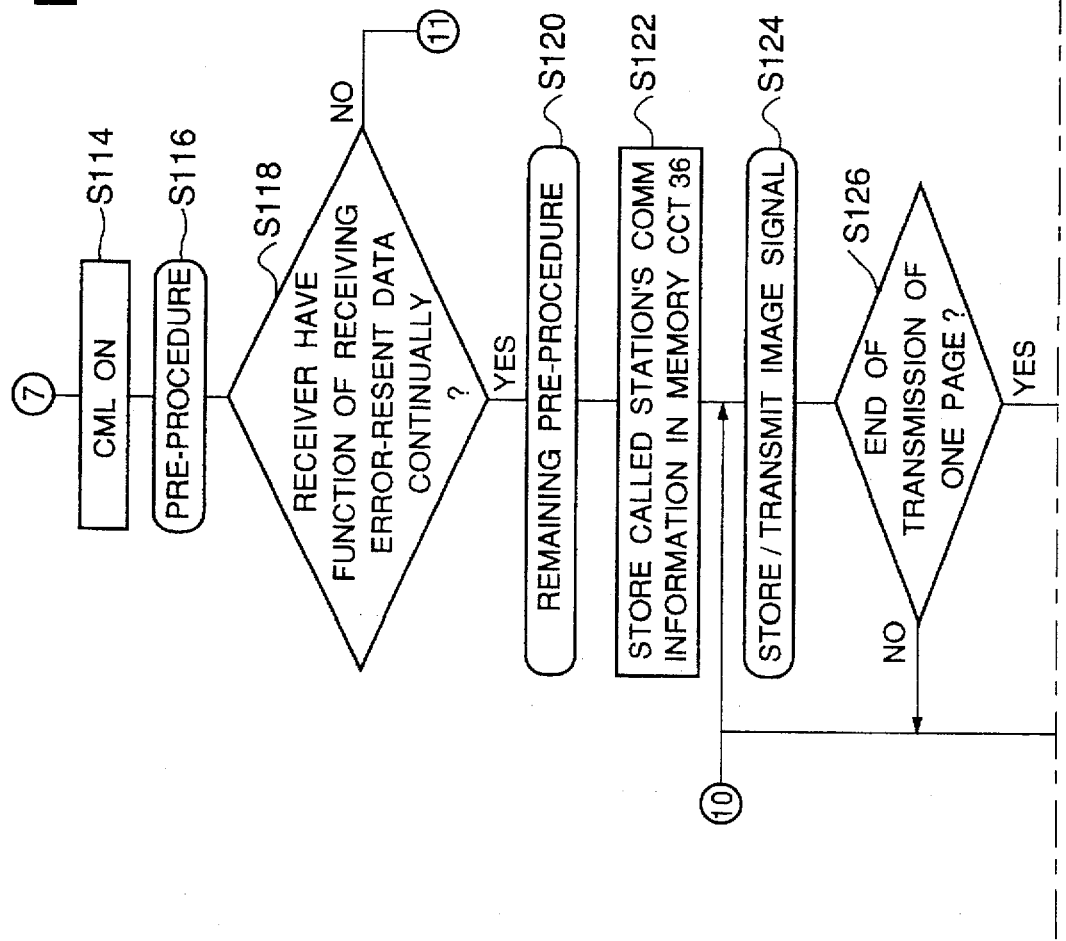

FIG.6
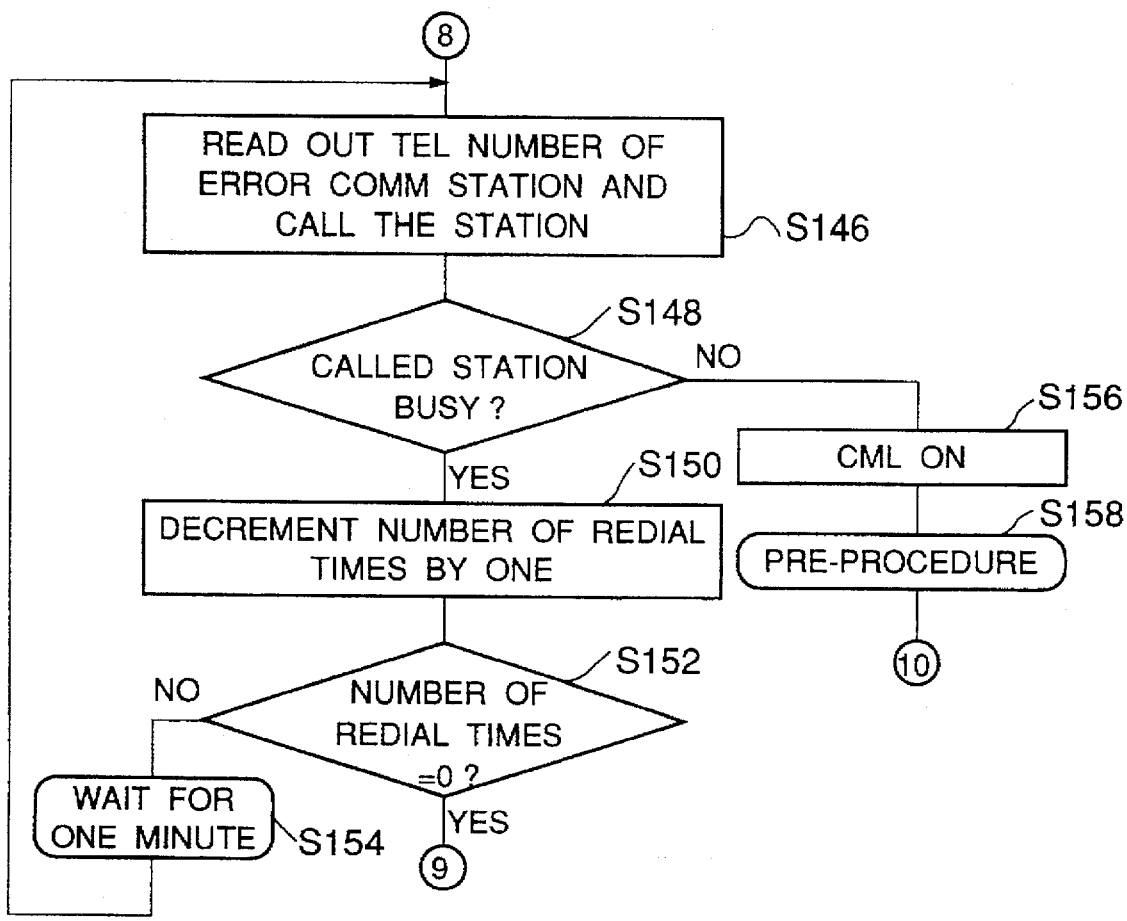
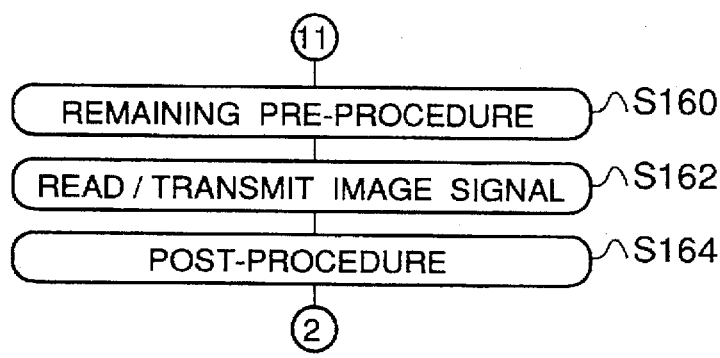

FIG.7
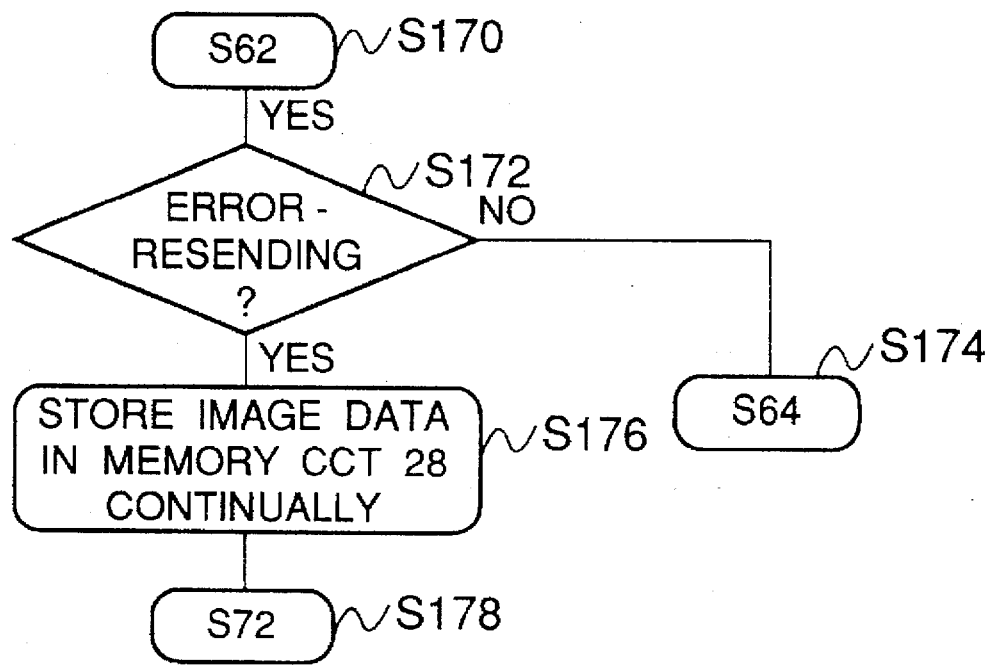
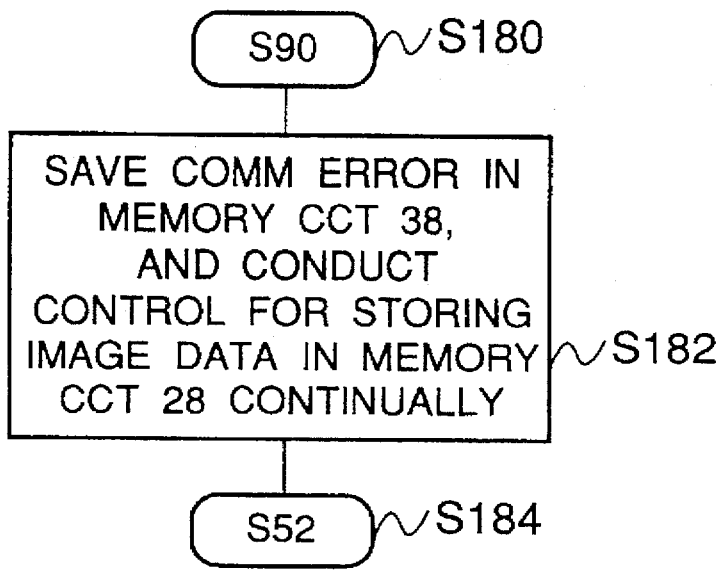

FIG.9
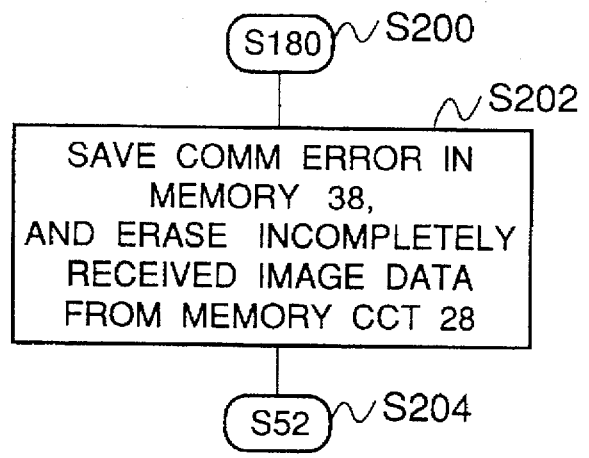
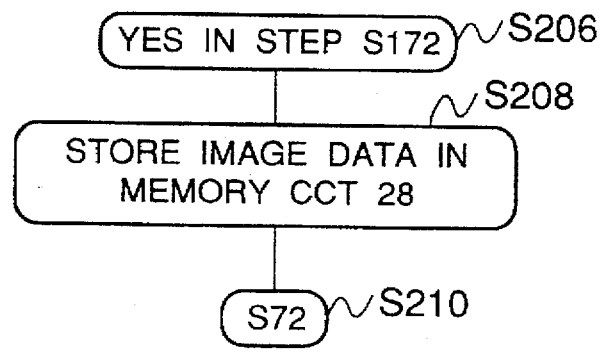
FIG.10
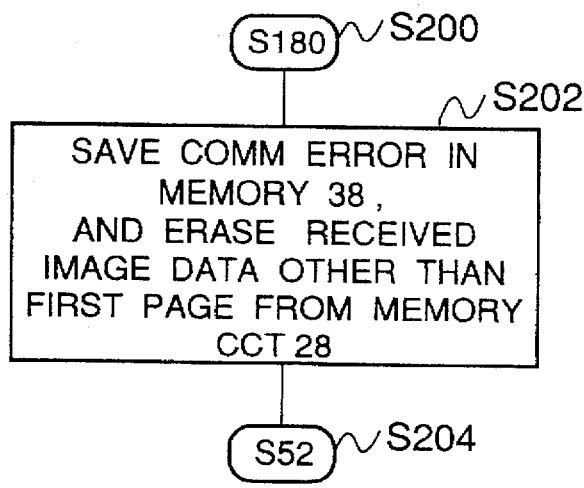

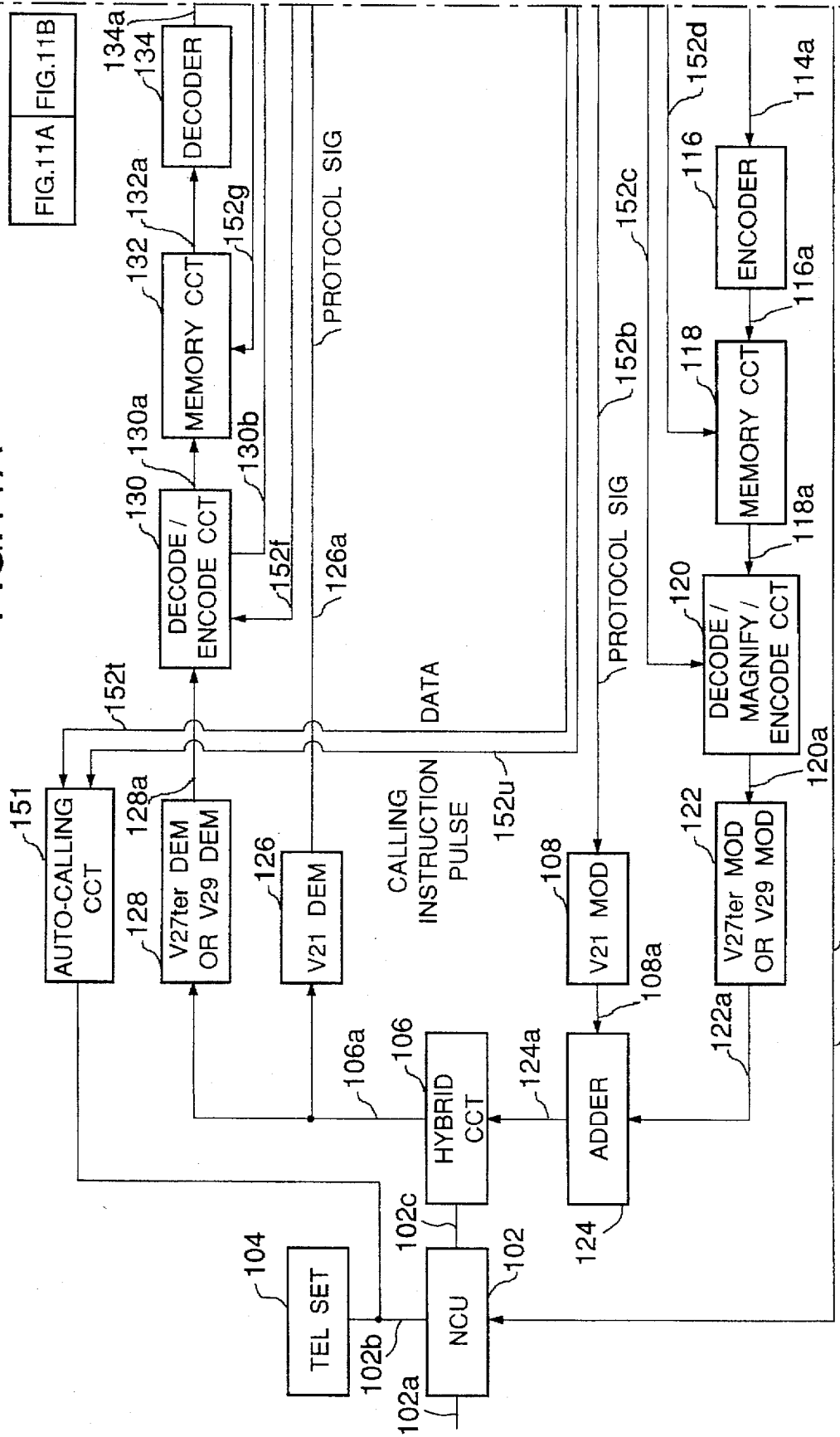

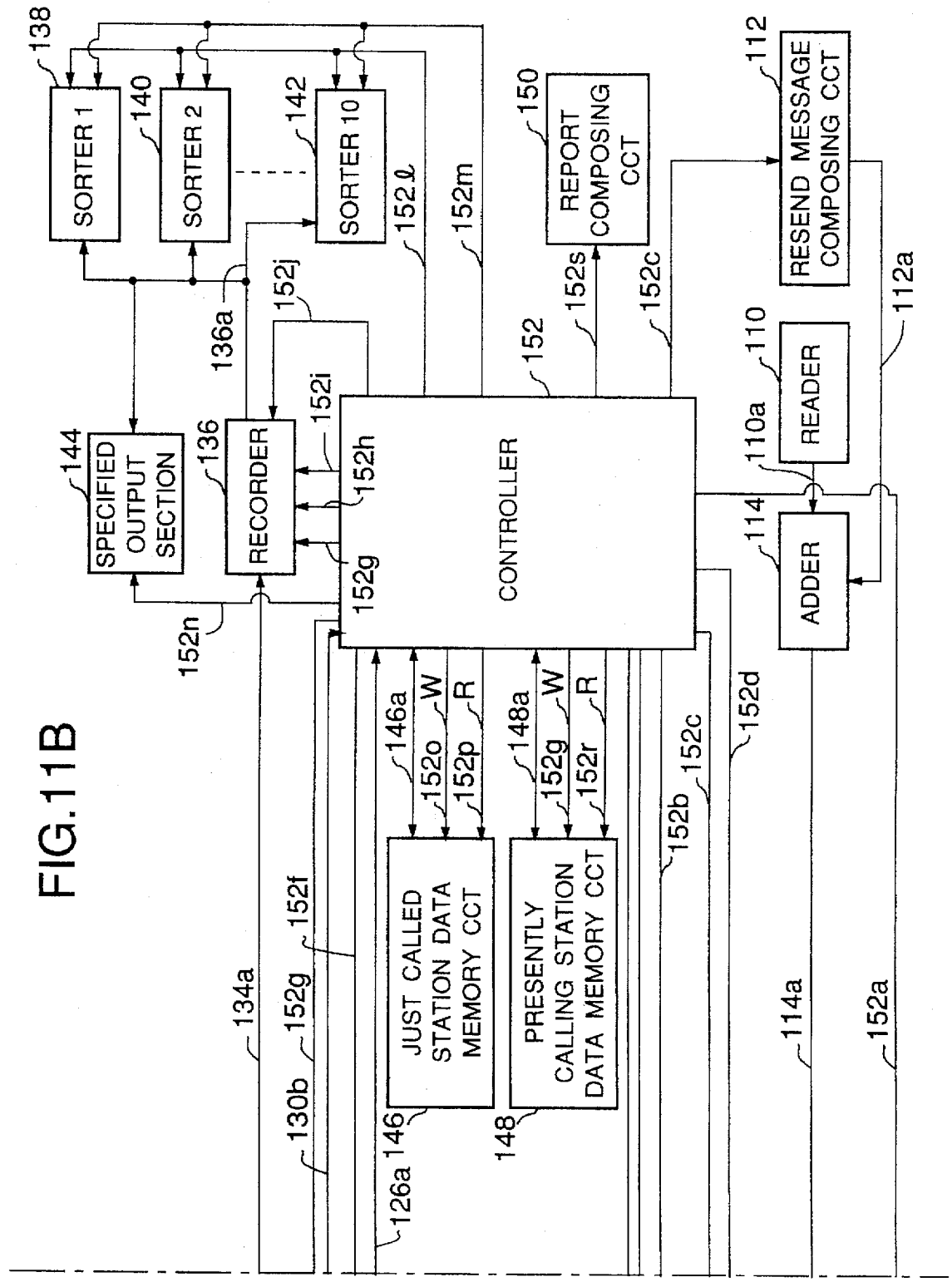

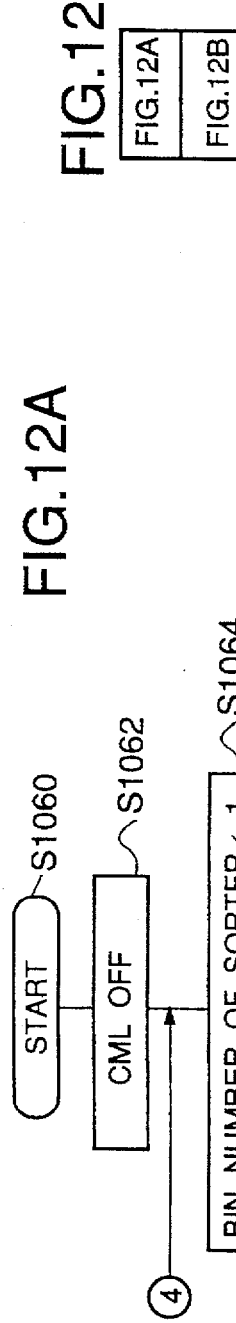
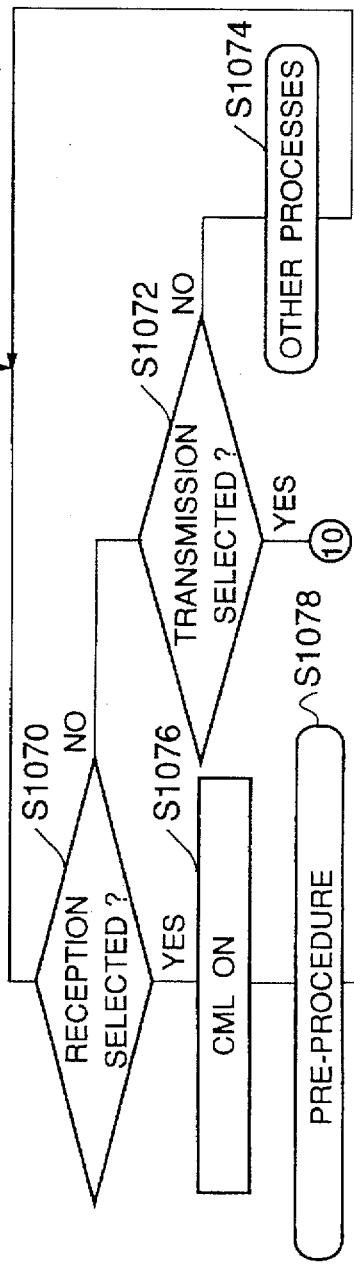
FIG.12A

FIG.15A
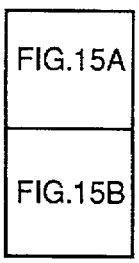
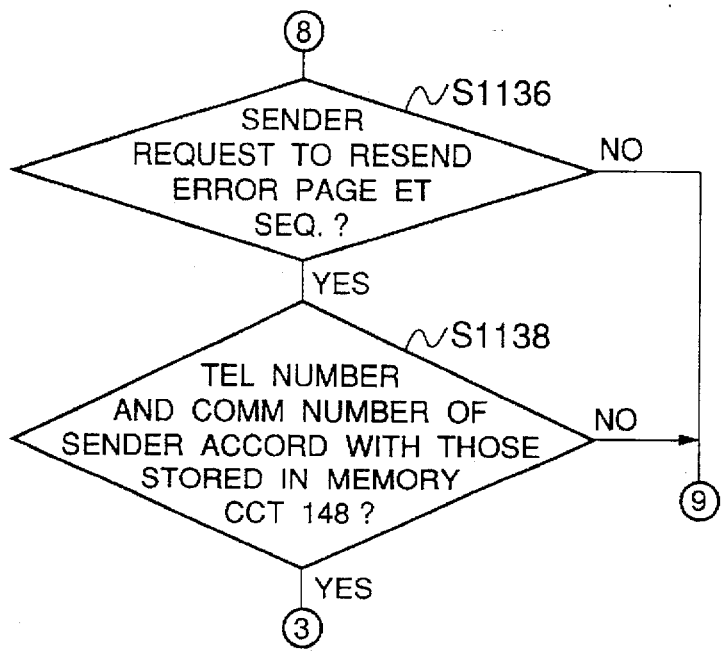
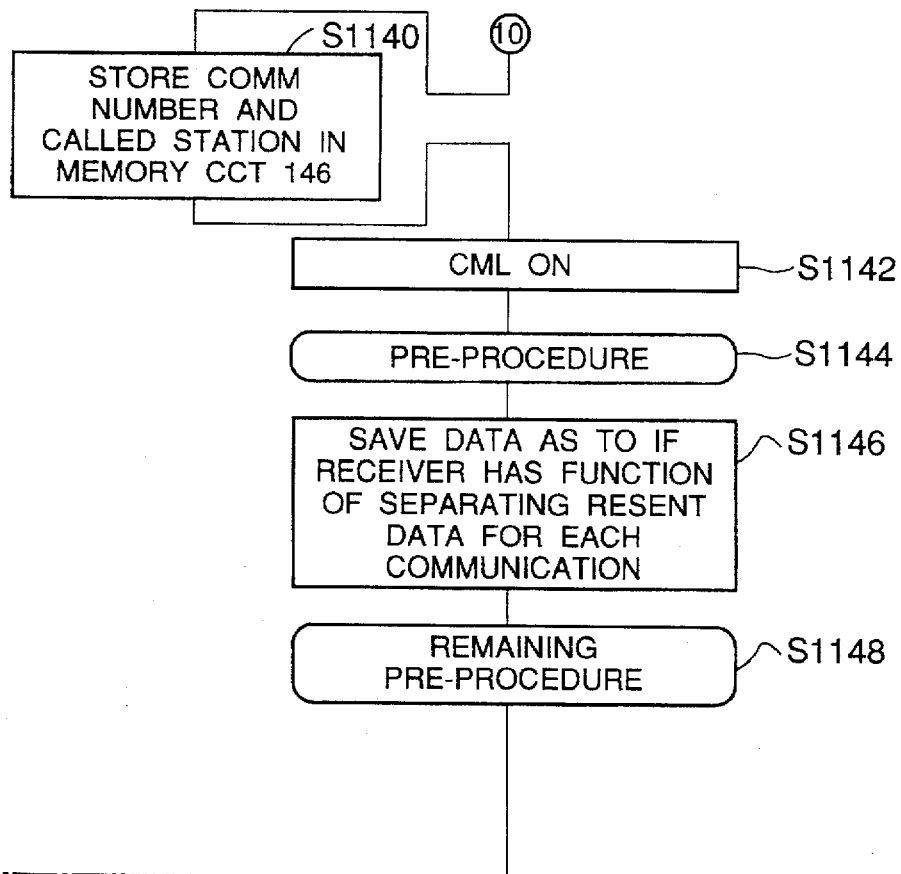

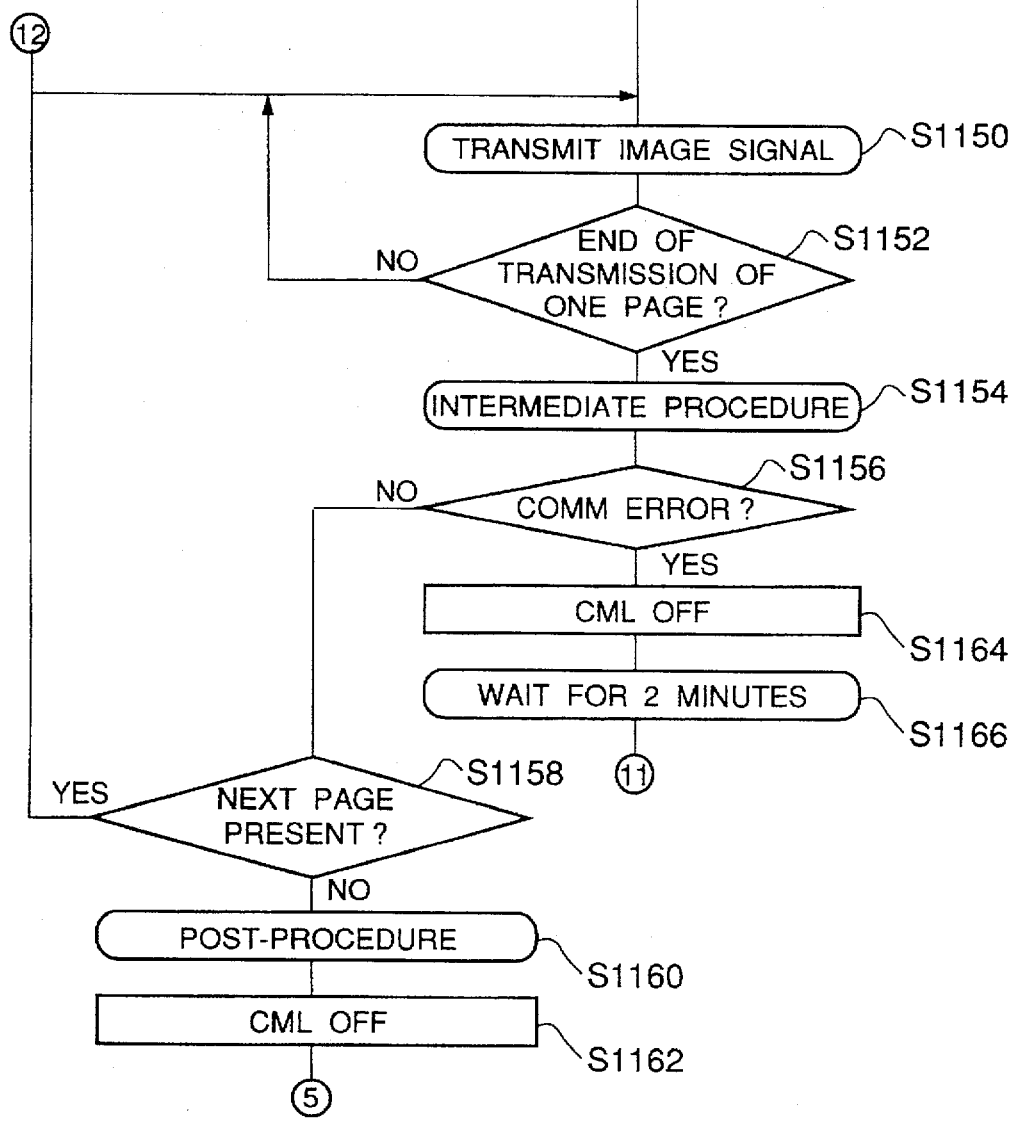

FIG.21

| COMM NO. | MODE | DESTINATION | TEL NO. | COMM DATA | NUMBER OF SHEETS | RESULT |
|---|---|---|---|---|---|---|
| 1011 | SEND | CANON SALES | 03-3111-2222 | Oct.10.1992 11:00~11:15 | 10 | GOOD |
| 1012 | SEND | CANON BUSUINESS | 03-3111-2221 | Oct.10.1992 11:40~11:45 | 5 | GOOD |
| 1013 | SEND | CANON ELECTRONICS | 03-3112-1111 | Oct.10.1992 11:50~11:55 | 5 | ERROR |
| 1014 | SEND | CANON ELECTRONICS | 03-3112-1111 | Oct.10.1992 11:58~12:10 | 20 | RESENT (1013) GOOD |
| 1015 | | | | | | |
| 1016 | | | | | | |
| 1017 | | | | | | |
| 1018 | | | | | | |
| 1019 | | | | | | |
| 1020 | | | | | | |
| 1021 | | | | | | |
| 1022 | | | | | | |
| 1023 | | | | | | |
| 1024 | | | | | | |
| 1025 | | | | | | |

DATA COMMUNICATION APPARATUS WHICH PROCESSES FIRST AND SECOND COMMUNICATION DATA BASED ON A DETERMINED RELATIONSHIP BETWEEN THE FIRST AND SECOND COMMUNICATION DATA

This application is a division of application Ser. No. 08/186,990 filed Jan. 28, 1994.

BACKGROUND OF THE INVENTION

1. Field of the Invention

The present invention relates to a facsimile apparatus and, more particularly, to a facsimile apparatus capable of resending an error page et seq. Et seq. means that when an error page is received, transmission is stopped and a message is sent, and the transmitter makes another transmission starting with the error page.

The present invention also relates to a facsimile apparatus which can resend an error page et seq. and separate and output data for each communication.

2. Related Background Art

In a conventional facsimile apparatus capable of resending an error page et seq., the receiver is not notified that the sender can resend the error page et seq., and resending is not notified by a protocol signal when resending of the error page et seq. is actually performed.

It has been conventionally proposed to send image signals with data indicating resending communication when resending of an error page et seq. is performed. However, this data is not included in a protocol signal, so that the receiver cannot recognize whether it is a normal reception operation or error-resending.

The receiver cannot recognize whether error-resending is performed. For this reason, another communication (reception) is inserted between the error communication (reception) and the communication (reception) of error-resending. In this case, the user cannot recognize by observation that the two communications (receptions) are the same communication (reception), and correct distribution is impossible.

For a facsimile apparatus which separates and outputs data for each communication, a method has been proposed in which the bin of a sorter is changed for each communication, data of one communication is bound by a stapler, or a cutting operation is performed for each communication when roll paper is used. In such an apparatus, an error communication is handled as one communication.

If the sender has a function of resending an error page et seq. upon the error communication, the error communication and the error-resending are handled as two communications. When data is separated for each communication by a sorter, these communications are thus output to two bins of the sorter. When data for each communication is bound by a stapler or the like for separation, the binding operation is performed for each communication (two communications). When data is recorded on roll paper and separated by cutting the paper for each communication, the cutting operation is performed for each communication (two communications).

As described above, even if the receiver has a function of separating data for each communication, one communication is divided into two or more communications when error-resending is performed. Therefore, the user cannot exactly recognize distinction between communications.

SUMMARY OF THE INVENTION

It is an object of the present invention to improve a facsimile apparatus.

It is another object of the present invention to provide a convenient facsimile apparatus which resends an error page et seq. when communication is incompletely ended due to a communication error.

It is still another object to provide a facsimile apparatus which can continually output pages prior to an error page and the error page et seq. which are sent after redial, when the line is disconnected due to a communication error.

BRIEF DESCRIPTION OF THE DRAWINGS

FIG. 1 is comprised of FIGS. 1A and 1B showing block diagrams of a facsimile apparatus according to the first embodiment;

FIG. 2 is comprised of FIGS. 2A and 2B showing flow charts of a controller of the first embodiment;

FIG. 3 is a flow chart of the controller of the first embodiment;

FIG. 6 is a flow chart of the controller of the first embodiment;

FIG. 7 is a flow chart of the fifth embodiment;

FIG. 9 is a flow chart of the sixth embodiment;

FIG. 10 is a flow chart of the seventh embodiment;

FIG. 11 is comprised of FIGS. 11A and 11B showing block diagrams of a facsimile apparatus according to the eighth embodiment of the present invention;

FIG. 15 is comprised of FIGS. 15A and 15B showing flow charts of the control steps of the controller 152 in FIG. 11B;

FIG. 21 is a table showing an example of a communication result report.

DETAILED DESCRIPTION OF THE PREFERRED EMBODIMENTS

(First Embodiment)

Figure 4:
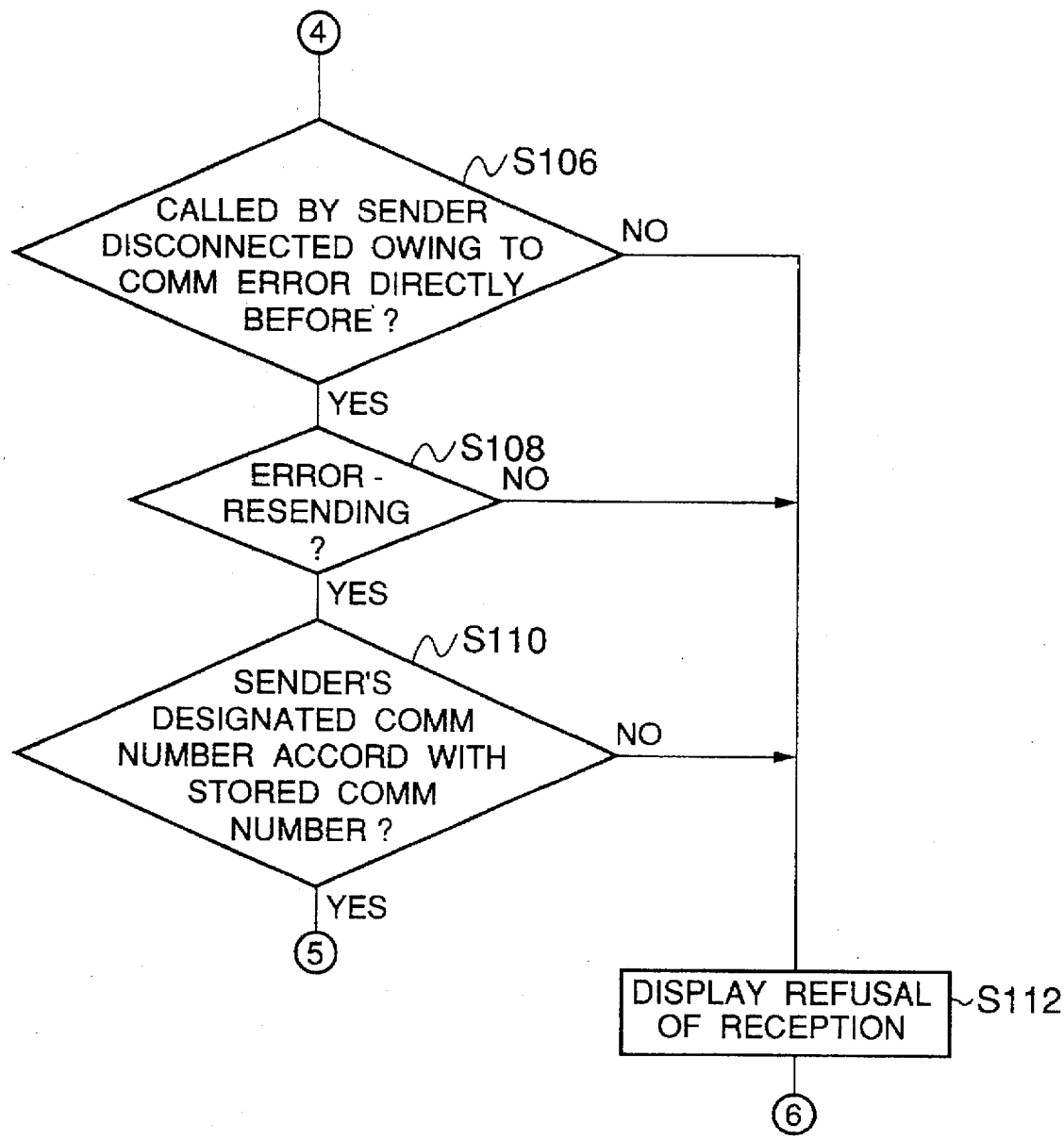
FIG. 4 is a flow chart of the controller of the first embodiment.

An embodiment of the present invention will be described below in detail with reference to the accompanying drawings.

FIGS. 1A and 1B are block diagrams showing a facsimile apparatus according to an embodiment of the present invention.

Referring to FIGS. 1A and 1B, an NCU (Network Control Unit) 2 is connected to a terminal of a line to use a telephone network for, e.g., data communications, executes connection control of a telephone exchange network, performs switching to a data communication path, and holds a loop. A signal line 2a serves as a telephone line. When the signal level of a signal on a signal line 40a is "0", the NCU 2 connects the telephone line to the side of a telephone set, i.e., connects the signal line 2a to a signal line 2b. when the signal level of a signal input from the signal line 40a is "1", the NCU 2 connects the telephone line to the side of a facsimile apparatus, i.e., connects the signal line 2a to a signal line 2c. In a normal state, the telephone line is connected to the side of the telephone set.

A telephone set 4 is arranged in the apparatus.

A hybrid circuit 6 separates transmission-system signals and reception-system signals. That is, a transmission signal on a signal line 20a is sent onto the telephone line via the signal line 2c and the NCU 2. A signal sent from a partner station is output to a signal line 6a via the NCU 2 and the signal line 2c.

A modulator 8 performs modulation on the basis of the known CCITT recommendation V21. The modulator 8 receives and modulates a protocol signal on a signal line 40b, and outputs the modulated data onto a signal line 8a.

A reader 10 sequentially reads image signals for one main scan line from a transmission original, and generates a signal train representing two values, i.e., black and white. The reader 10 comprises an image pickup element such as a CCD (Charged Coupled Device), and an optical system. The signal train of the binary data of black and white is sent onto a signal line 10a.

An encoder 12 receives read data output onto the signal line 10a, and outputs the encoded (by MR (Modified READ) encoding with K=8) data onto a signal line 12a.

A memory circuit 14 stores the encoded data output onto the signal line 12a in accordance with the control of a signal line 40c, and outputs the stored data onto a signal line 14a in accordance with the control of the signal line 40c.

A decode/magnify/encode circuit 16 decodes data on the signal line 14a, magnifies it in correspondence with the receiver of the partner station, and outputs the data encoded again onto a signal line 16a in accordance with the control of a signal line 40d as needed.

A modulator 18 performs modulation based on the known CCITT recommendation V27ter (differential phase modulation) or V29 (quadrature modulation). The modulator 18 receives and modulates a signal on the signal line 16a and outputs the modulated data onto a signal line 18a.

An adder 20 receives signals from the signal lines 8a and 18a, and outputs the sum data onto a signal line 20a.

A demodulator 22 performs demodulation based on the known CCITT recommendation V21. The demodulator 22 receives and demodulates a signal from the signal line 6a, and outputs the demodulated data onto a signal line 22a.

A demodulator 24 performs demodulation based on the known CCITT recommendation V27ter (differential phase modulation) or V29 (quadrature modulation). The demodulator 24 receives and demodulates a signal on the signal line 6a and outputs the demodulated data onto a signal line 24a.

A decode/encode circuit 26 receives and decodes data from the signal line 24a, outputs the data encoded again by MR encoding with K=8 onto a signal line 26a, and at the same time, outputs the decoded data onto a signal line 26b.

A memory circuit 28 stores the encoded data on the signal line 26a in accordance with the control of a signal line 40f, and outputs the stored data onto a signal line 28a in accordance with the control of the signal line 40f.

A decoder 30 receives a signal on the signal line 28a, and outputs the decoded (by MR (Modified READ) decoding) data onto a signal line 30a.

A recorder (LBP) 32 receives data from the signal line 30a, and sequentially records it in units of lines at a constant rate.

An auto-calling circuit 34 receives telephone number information from a signal line 40g when a calling instruction pulse is generated onto a signal line 40h, and outputs a select signal onto the signal line 2b.

When a communication error occurs, and the resending designation is to be stored in an error-resending designation memory circuit 36, data is output onto a signal line 36a in the following format; a called station number (e.g., 00 of ten communications from 00 to 09), a space, a communication number (e.g., 1000 of numbers from 0000 to 9999), a space, a communication date (e.g., 9204151010 for 10:10 on Apr. 15, 1992), a space, and a called station telephone number (e.g., 03-3758-2111). After the data is output onto the signal line 36a, a controller 40 generates a write pulse onto a signal line 40i. When data stored in the circuit 36 is to be read out, the controller 40 generates a read pulse onto a signal line 40j after the called station number (e.g., 00) is output onto the signal line 36a. The circuit 36 then outputs the data in the following format; the communication number (e.g., 1000) registered in correspondence with the called station number (e.g., 00), a space, the communication date (e.g., 9204151010), a space, and the called station telephone number (e.g., 03-3758-2111). The circuit 36 outputs the data onto the signal line 36a when the read pulse is generated onto the signal line 40j.

A sender's noticed communication information storing circuit 38 stores a telephone number, a communication number, and a communication date notified by a sender when an error occurs in communication with a protocol signal indicating that "error-resending is performed when a communication error occurs". When the data is stored in the circuit 38, the sender's number and the data are output onto a signal line 38a in the following format; the sender's number (e.g., 01 of ten communications from 00 to 09), a space, the sender's telephone number (e.g., 03-3481-1111), a space, the sender's communication number (e.g., 1111), a space, and the communication date (e.g., 9204151020 for 10:20 on Apr. 15, 1992). After the data is output onto the signal line 38a, a write pulse is generated onto a signal line 40k. When data stored in the circuit 38 is to be read out, the sender's number (e.g., 01) is output onto the signal line 38a, and a read pulse is generated onto a signal line 401. The circuit 38 then outputs the data onto the signal line 38a in the following format; the sender's telephone number (e.g., 03-3481-1111) registered in correspondence with the sender's number (e.g., 01), a space, the sender's communication number (e.g., 1111), a space, and the communication date (e.g., 9204151020).

The controller 40 performs the following operation in a facsimile apparatus capable of resending an error page et seq. when a communication error occurs. In the transmission mode, the controller 40 notifies the receiver in a pre-procedure that error-resending is possible. In the reception mode, the controller 40 stops recording of an error page when notified by the sender of error-resending. When a communication error occurs, the controller 40 refuses reception except for error-resending by the sender disconnected due to the communication error for a predetermined period of time. In the transmission mode, the controller 40 notifies the receiver of error-resending by a protocol signal when error-resending is performed. The controller 40 mainly performs the above controls.

FIGS. 2A and 2B are flow charts showing the control of the controller 40 in FIG. 1B.

Referring to FIGS. 2A and 2B, step S50 represents a start.

In step S52, a signal of level "0" is output onto the signal line 40a to turn off a CML.

In step S54, it is checked if reception is selected. If YES in step S54, the flow advances to step S60; otherwise, the flow advances to step S56.

In step S56, it is checked if transmission is selected. If YES in step S56, the flow advances to step S114 (FIG. 5A); otherwise, the flow advances to step S58 to execute other processes.

In step S60, a signal of level "1" is output onto the signal line 40a to turn on the CML.

Step S62 represents a pre-procedure. The receiver notifies that it has a function of continually receiving an error page et seq. when error-resent data is received.

In step S64, it is checked if the sender has a function of resending an error page et seq. according to this embodiment. If YES in step S64, the flow advances to step S70; otherwise, the flow advances to step S66.

Step S66 represents reception/recording of an image signal.

Step S68 represents a post-procedure.

In step S70, the sender's noticed telephone number, communication number, and communication date are stored in circuit 38 in correspondence with the sender's number.

Step S72 represents reception/recording of the image signal in the memory circuit 28.

In step S74, it is checked if reception of one page is ended. If YES in step S74, the flow advances to step S78; otherwise, the flow advances to step S76.

In step S76, it is checked if an error occurs. If YES in step S76, the flow advances to step S90 (FIG. 3); otherwise, the flow returns to step S72.

Step S78 represents an intermediate procedure. Recording of pages is continued.

In step S79, it is checked if an error occurs. If YES in step S79, the flow advances to step S90 FIG. 3); otherwise, the flow advances to step S80.

In step S80, it is checked if a next page is present. If YES in step S80, the flow returns to step S72; otherwise, the flow advances to step S82.

Step S82 represents a post-procedure. Recording of pages is continued.

In step S84 (FIG. 3), a signal of level "0" is output onto the signal line 40a to turn off the CML.

Step S86 represents recording of all pages to be recorded.

In step S88, since the communication is ended without an error, the sender's noticed telephone number, communication number, and communication date registered in the circuit 38 in correspondence with the sender's number in step S70 are erased.

In step S90, a signal of level "0" is output onto the signal line 40a to turn off the CML.

Step S92 represents recording of pages prior to the error page.

Step S94 represents setting of five minutes in a timer T1.

In step S96, it is checked if the receiver is called. If YES in step S96, the flow advances to step S98; otherwise, the flow advances to step S102.

In step S98, a signal of level "1" is output onto the signal line 40a to turn on the CML.

Step S100 represents a pre-procedure. The receiver notifies that it has a function of receiving an error page et seq. when error-resent data is received.

In step S102, it is checked if the timer T1 is time out. If YES in step S102, the flow advances to step S104; otherwise, the flow returns to step S96.

In step S104, a communication error is displayed because an error occurs and resending is not performed within a predetermined period of time. The sender's noticed telephone number, communication number, and communication date registered in the circuit 38 in correspondence with the sender's number in step S70 are erased.

In step S106 (FIG. 4), information registered in the circuit 38 is compared with the received information to check if the receiver is called by the sender disconnected owing to the communication error directly before. If YES in step S106, the flow advances to step S108; otherwise, the flow advances to step S112.

In step S108, it is checked if the sender notifies of error-resending. If YES in step S108, the flow advances to step S110; otherwise, the flow advances to step S112.

In step S110, information registered in the circuit 38 is read out to check if the communication number designated by the sender accords with that of She error communication. If YES in step S110, the flow returns to step S72 (FIG. 2B); otherwise, the flow advances to step S112.

In step S112, refusal of reception is displayed. At the same time, the sender's telephone number and the like are also displayed.

Figure 5B:
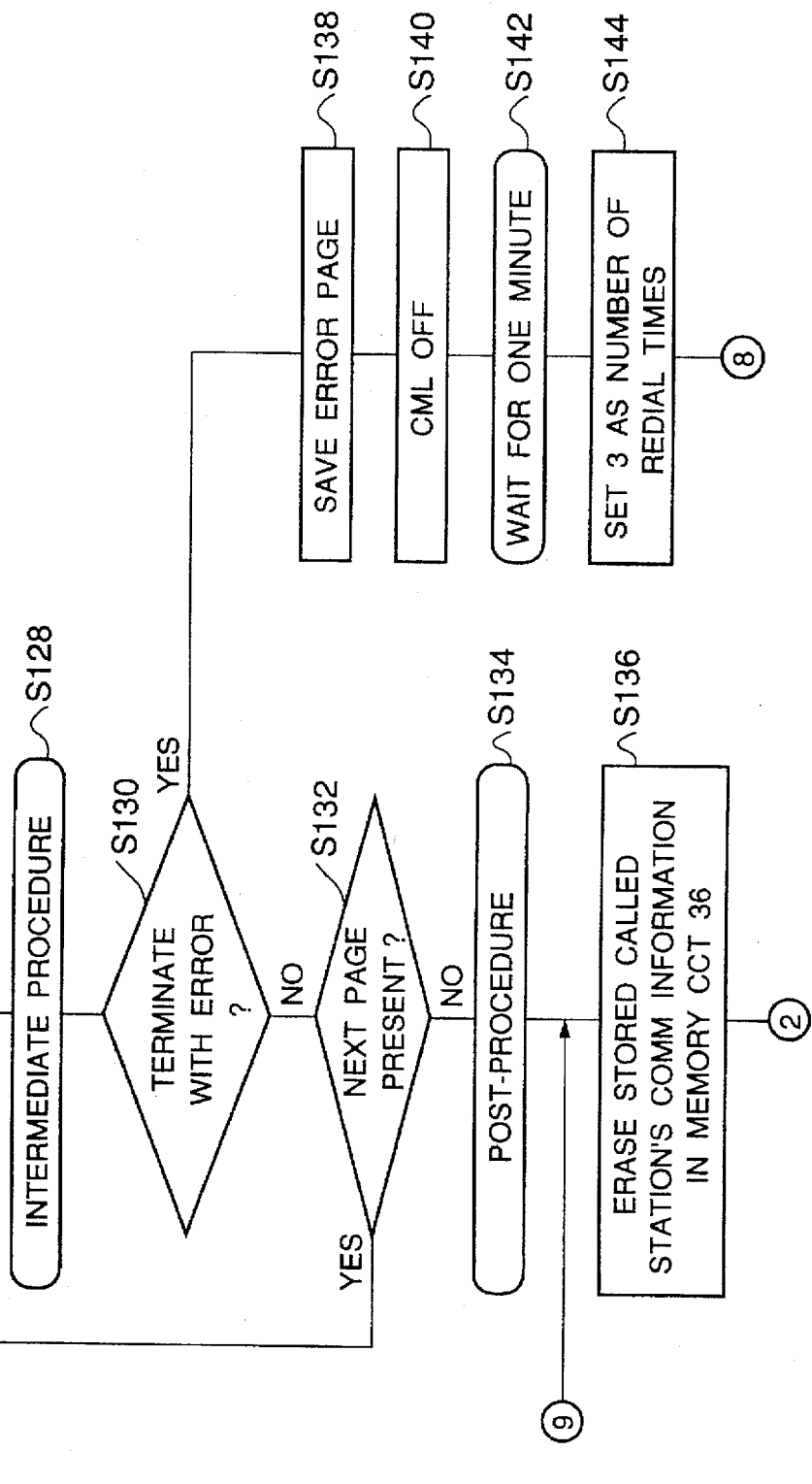
FIG. 5 is comprised of FIGS. 5A and 5B showing flow charts of the controller of the first embodiment.

If transmission is selected in step S56 in FIG. 2A, the flow advances to step S114 in FIG. 5A.

In step S114 (FIG. 5A), a signal of level "1" is output onto the signal line 40a to turn on the CML.

Step S116 represents a pre-procedure.

In step S118, it is checked if the receiver has a function of continually receiving an error page et seq. when error-resent data is received. If YES in step S118, the flow advances to step S120; otherwise, the flow advances to step S160 (FIG. 6).

Step S120 represents the remaining pre-procedure. The sender notifies that it has a function of error-resending, in addition to its telephone and communication numbers.

In step S122, the communication number, the communication date, and the telephone number of the called station are stored in the circuit 36 in correspondence with the receiver's number.

Step S124 represents storing of the image signal in the memory circuit 14 and transmission of the data stored in the memory circuit.

In step S126, it is checked if transmission of one page is ended. If YES in step S126, the flow advances to step S128; otherwise, the flow returns to step S124.

Step S128 represents an intermediate procedure.

In step S130, it is checked if the communication is terminated with an error. If YES in step S128, the flow advances to step S138; otherwise, the flow advances to step S132.

In step S132, it is checked if a next page is present. If YES in step S132, the flow returns to step S124; otherwise, the flow advances to step S134.

Step S134 represents a post-procedure.

In step S136, since the communication is ended without an error, the communication number, the communication date, and the telephone number of the called station registered in the circuit 36 in correspondence with the called station's number in step S122 are erased.

In step S138, the number of error pages is saved. In transmission of the image signal following step S158 (FIG. 6), error-resending is performed.

In step S140, a signal of level "0" is output onto the signal line 40a to turn off the CML.

Step S142 represents waiting for one minute.

In step S144, three is set as the number of redial times.

In step S146 (FIG. 6), the telephone number of the error communication station is read out from the circuit 36 to call the station.

In step S148, it is checked if the called station is busy. If YES in step S148, the flow advances to step S150 to decrease the number of redial times by one; otherwise, the flow advances to step S156.

In step S152, it is checked if the number of redial times is 0. If YES in step S152, the flow advances to step S136; otherwise, the flow advances to step S154 to wait for one minute.

In step S156, a signal of level "1" is output onto the signal line 40a to turn on the CML.

Step S158 represents a pre-procedure. The sender notifies that error-resending is performed, in addition to its telephone and communication numbers.

Step S160 represents the remaining pre-procedure.

Step S162 represents reading/transmission of the image signal.

Step S164 represents a post-procedure.

(Second Embodiment)

In the above embodiment, it is assumed that, when a communication error occurs, error-resending is repeated until the communication is ended without an error. However, the number of error-resending times may be limited.

(Third Embodiment)

In the above embodiment, it is assumed that, when communication is terminated with an error, the receiver accepts only communication by the same sender (the telephone number accords with the stored data) with the same communication number (the communication number notified by the sender accords with that in error-resending), and only when error-resending is notified. However, conditions for a reception refusal may be two of the above conditions or others.

(Fourth Embodiment)

In the above embodiment, it is assumed that, when transmission is selected and the receiver does not have a function of the above embodiment, error-resending is not performed when a communication error occurs. However, even in this case, when a communication error occurs, error-resending may be performed.

(Fifth Embodiment)

When the receiver has a means for storing received data, the received data is stored in the storing means. Upon completion of storing data for one communication in the storing means, a recording operation is performed. If an error occurs while the receiver is notified by the sender that error-resending is possible when a communication error occurs, communications by other stations are also accepted. When data for one communication is stored in the storing means, the data is sequentially recorded. In error-resending, pages are continually stored in the storing means. When data for one communication is stored in the storing means, recording is started. When an error occurs and error-resending is not performed within the predetermined period of time, it is handled as a communication error, and data received before is read out from the storing means.

Figure 8:
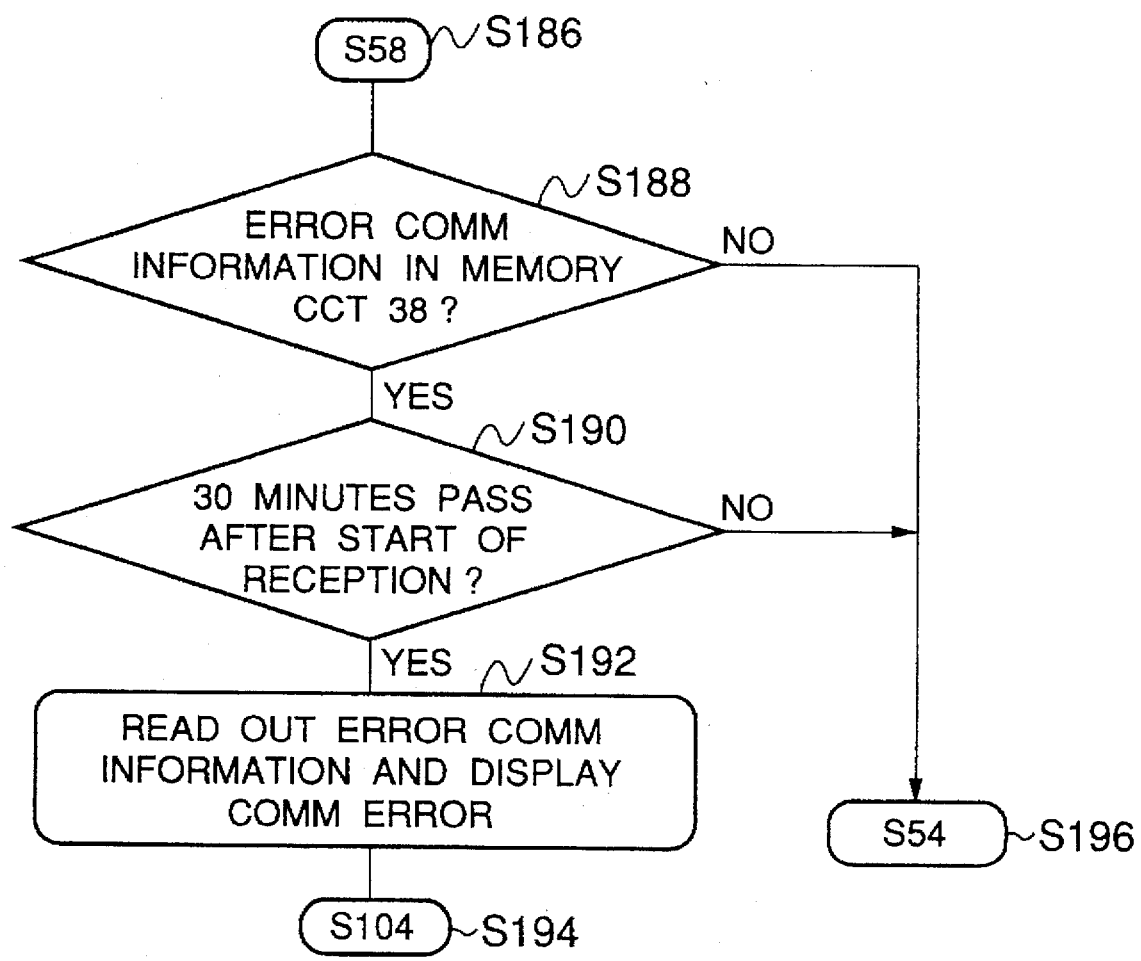
FIG. 8 is another flow chart of the fifth embodiment.

FIGS. 7 and 8 show a detailed example of the above control, in which only steps different from those in the control in FIGS. 2A to 6 are shown.

In this case, however, step S72 in FIG. 2B is changed to "STORE IMAGE SIGNAL IN MEMORY CIRCUIT 28". Steps S78 and S82 in FIG. 2B are changed to "NO RECORDING OPERATION". Step S86 in FIG. 3 is changed to "RECORD ALL PAGES"

Step S170 represents step S62 in FIG. 2A.

In step S172, it is checked if error-resending is performed. If YES in step S172, the flow advances to step S176; otherwise, the flow advances to step S174 (step S64 in FIG. 2A).

In step S176, data is continually stored in the circuit 28 in correspondence with the designated communication number.

Step S178 represents step S72 in FIG. 2B.

Step S180 represents step S90 in FIG. 3.

In step S182, the communication error is saved in the circuit 38. Control for continually storing the received data in the memory circuit 28 is performed.

Step S184 represents step S52 in FIG. 2A.

Step S186 (FIG. 8) represents step S58 in FIG. 2A.

In step S188, it is checked if error communication information remains in the memory circuit 38. If YES in step S186, the flow advances to step S190; otherwise, the flow advances to step S196 (step S54 in FIG. 2A).

In step S190, it is checked if 30 minutes pass after the start of reception of the error communication. If YES in step S190, the flow advances to step S192; otherwise, the flow advances to step S196.

In step S192, the data stored in the memory in correspondence with the error communication is read out to display the communication error.

Step S194 represents an advance to step S104 in FIG. 3. The communication number stored in the circuit 38 is erased.

(Sixth Embodiment)

In a facsimile apparatus capable of resending data from the first page, the receiver is notified of it in the pre-procedure. When resending of data from the first page is performed, the receiver is notified of it by the sender. If the receiver has a means for storing the received data, the received data is stored in the storing means. Upon completion of storing data for one communication in the storing means, a recording operation is performed. If an error occurs while the receiver is notified by the sender that resending of data from the first page is possible when a communication error occurs, the received data in the storing means is erased.

FIG. 9 shows a detailed example of the above control, in which only steps different from those in the control in FIGS. 7 and 8 are shown. Others are the same as in the fifth embodiment.

In this case, however, steps S62 (FIG. 2A), S64 (FIG. 2A), S118 (FIG. 5A), S120 (FIG. 5A), and S158 (FIG. 6) are changed from resending of an error page et seq. to "RESENDING DATA FROM FIRST PAGE". The control from step S186 to step S196 in FIG. 8 is omitted.

Step S200 represents step S180 in FIG. 7.

In step S202, the communication error is saved in the circuit 38. On the other hand, the incompletely received data stored in the memory circuit 28 is erased from the memory.

Step S204 represents step S52 in FIG. 2A.

Step S206 represents YES in step S172 in FIG. 7.

Step S208 represents storage of the received data in the memory circuit 28 in correspondence with the designated communication number.

Step S210 represents an advance to step S72 in FIG. 2B.

(Seventh Embodiment)

In the sixth embodiment, if an error occurs while the receiver is notified by the sender that resending of data from the first page is possible when a communication error occurs, the received data of all pages except for the first page is erased from the storing means. If resending of data from the first page is not performed within a predetermined period of time, it is handled as a communication error, and the data of the first page is read out for a communication result report or the like.

FIG. 10 shows a detailed example of this control, in which only steps different from those in the control in FIG. 9 are shown. Others are the same as in the sixth embodiment. In this case, the control from step S186 to step S196 in FIG. 8 is restored.

Referring to FIG. 10., step S202 in FIG. 9 is changed such that data other than the first page is erased from the memory circuit 28.

As described above, according to the present invention, when a communication error occurs and resending of the error page et seq. is performed, the receiver can continually record data for the two communications (receptions) without other data inserted therebetween, and the user can appropriately distribute the received data. In addition, the function of error-resending can be more efficiently utilized as compared to a conventional apparatus.

(Eighth Embodiment)

An embodiment of the present invention will be described below in detail with reference to the accompanying drawings.

FIGS. 11A and 11B are block diagrams showing a facsimile apparatus according to an embodiment of the present invention.

Referring to FIG. 11A and 11B, an NCU (Network Control Unit) 102 is connected to a terminal of a line to use a telephone network for, e.g., data communications, executes connection control of a telephone exchange network, performs switching to a data communication path, and holds a loop. A signal line 102a serves as a telephone line. When the signal level of a signal on a signal line 152a is "0", the NCU 102 connects the telephone line to the side of a telephone set, i.e., connects the signal line 102a to a signal line 102b, When the signal level of a signal input from the signal line 152a is "1", the NCU 102 connects the telephone line to the side of a facsimile apparatus, i.e., connects the signal line 102a to a signal line 102c. In a normal state, the telephone line is connected to the side of the telephone set.

A telephone set 104 is arranged in the apparatus.

A hybrid circuit 106 separates transmission-system signals and reception-system signals. That is, a transmission signal on a signal line 124a is sent onto the telephone line via the signal line 102c and the NCU 102. A signal sent from a partner station is output onto a signal line 106a via the NCU 102 and the signal line 102c.

A modulator 108 performs modulation on the basis of the known CCITT recommendation V21. The modulator 108 receives and modulates a protocol signal on a signal line 152b, and outputs the modulated data onto a signal line 108a.

A reader 110 sequentially reads image signals for one main scan line from a transmission original, and generates a signal train representing two values, i.e., black and white. The reader 110 comprises an image pickup element such as a CCD (Charged Coupled Device), and an optical system. The signal train of the binary data of black and white is sent onto a signal line 110a.

A resend message composing circuit 112 outputs onto a signal line 112a, for example, information "this is error-resending of data sent at 10:20 on 24 Nov. 1992 in communication number 2311", as a dot pattern.

An adder 114 receives information on the signal lines 110a and 112a, and outputs the sum data onto a signal line 114a.

An encoder 116 receives read data on the signal line 114a or a resend message, and outputs the encoded (by MH (Modified Huffman) or MR (Modified READ) encoding) data onto a signal line 116a.

A memory circuit 118 stores the encoded data on the signal line 116a in accordance with the control of a signal line 152d, and outputs the stored data onto a signal line 118a in accordance with the control of the signal line 152d.

A decode/magnify/encode circuit 120 receives data from the signal line 118a, decodes, modifies, and encodes it again as needed in accordance with magnification data, mode data, and encoded data onto a signal line 152e, and outputs the data onto a signal line 120a.

A modulator 122 performs modulation based on the known CCITT recommendation V27ter (differential phase modulation) or V29 (quadrature modulation). The modulator 122 receives and modulates a signal on the signal line 112a and outputs the modulated data onto a signal line 114a.

An adder 124 receives signals from the signal lines 108a and 122a, and outputs the sum data onto a signal line 124a.

A demodulator 126 performs demodulation based on the known CCITT recommendation V21. The demodulator 126 receives and V21-demodulates a signal from the signal line 106a, and outputs the demodulated data onto a signal line 126a.

A demodulator 128 performs demodulation based on the known CCITT recommendation V27ter (differential phase modulation) or V29 (quadrature modulation). The demodulator 128 receives and demodulates a signal from the signal line 106a, and outputs the demodulated data onto a signal line 128a.

A decode/encode circuit 130 receives and decodes a signal from the signal line 128a, and outputs the data encoded again by MR encoding with K=8 onto a signal line 130a in accordance with the control of a signal line 152f. The decode/encode circuit 130 outputs the error conditions of reception onto a signal line 130b.

A memory circuit 132 stores the demodulated data on the signal line 130a in accordance with the control of a signal line 152g, and outputs the stored data onto a signal line 132a in accordance with the control of the signal line 152g.

A decoder 134 receives a signal on the signal line 132a, and outputs the decoded (by MR (Modified READ) decoding) data onto a signal line 124a.

A recorder 136 receives data from the signal line 134a, and sequentially records it in units of lines.

When a signal of level "0" is output onto the signal line 152h, the recorder 136 performs binding or cutting to separate data for each communication. When a signal of level "1" is output onto the signal line 152h, the recorder 136 separates data for each communication by sorters. When a signal of level "0" is output onto the signal line 152h, and data for one communication is separated by binding, data of one page is sequentially recorded. Upon completion of recording of one page, a pulse is generated onto a signal line 152k to shift the recorded sheet downward by one step. Upon completion of recording of one page, when a pulse is generated onto a signal line 152n, the recorded data is output to a specified output section 144. When the data is correctly received, a pulse is generated onto the signal line 152k to sequentially stock the recorded sheets downward by one step. When data for one communication is stocked, a bind instruction pulse 2 is generated onto a signal line 152i. The data for one communication is then bound by a stapler or the like. The bound data is shifted downward by one more step. When an error occurs, a pulse is generated onto the signal line 152n to output the data to the specified output section 144.

When a signal of level "0" is output on the signal line 152h, and data for one communication is separated by cutting, data is sequentially recorded. Upon completion of recording of data for one communication, a cut instruction pulse is generated onto a signal line 152j to perform a cutting operation. At this time, data for one communication is shifted downward by two steps.

When a signal of level "1" is output onto the signal line 152h, i.e., data for each communication is separated by sorters, the bin number of a sorter is output onto a signal line 152l, and data of one page is then sequentially recorded. Upon completion of recording of one page, a pulse is generated onto a signal line 152m to cause the recorded sheets to fall on the designated sorter. Upon completion of recording of one page, when a pulse is generated onto the signal line 152m, the recorded data is output to the specified output section 144. When the data is correctly received, a pulse is generated onto the signal line 152m to sequentially output the data to the designated sorter. When an error occurs, a pulse is generated onto the signal line 152n to output the data to the specified output section 144.

A sorter 1 138, a sorter 2 140, ... a sorter 10 142 are arranged in this apparatus. The apparatus in this embodiment is assumed to have 10 sorters. Data 1 to 10 are output onto the signal line 152l, and a sorter is designated to receive the recorded data from a signal line 136a. When a pulse is generated onto the signal line 152m, data of one page recorded by the recorder 136 is output to the sorter designated by the signal line 152l.

The specified output section 144 stores recorded data. When a pulse is generated onto the signal line 152n, the data of one page recorded by the recorder 136 is output to the specified output section 144. In this case, in a system of recording received data in real time, an error data is stored in the specified output section 144.

A just called station data memory circuit 146 stores the called station (telephone number) and the communication number. When the data is stored in the circuit 146, the communication number (e.g., 1211), a space, and the just called telephone number (e.g., 3758-1111) are output onto a signal line 146a, and a write pulse is then generated onto a signal line 152o. When data stored in the circuit 146 is to be read out, a read pulse is generated onto a signal line 152p. At this time, the communication number (e.g., 1211), a space, and the just called telephone number (e.g., 3758-1111) stored in the circuit 146 are output onto the signal line 146a.

A presently calling station data memory circuit 148 stores the calling station (telephone number of the sender) and the communication number of the sender. When the data is stored in the circuit 148, the communication number (e.g., 1211), a space, and the telephone number of the sender (e.g., 3485-1212) are output onto a signal line 148a, and a write pulse is then generated onto a signal line 152q. When data stored in the circuit 148 is to be read out, a read pulse is generated onto a signal line 152r. At this time, the communication number (e.g., 1211), a space, and the telephone number of the sender (e.g., 3485-1212) stored in the circuit 148 are output onto the signal line 148a.

A report composing circuit 150 receives data from a signal line 152s to compose various reports.

A controller 152 mainly executes the following control operations. As a receiver, it has a means for notifying the sender if it has a function of separating data for each communication, including a function of integrating error communication data and resent data of an error page et seq. As a sender, it has a means for notifying the receiver if resending of an error page et seq. is performed. When the sender is notified that the receiver has a function of separating data for each communication, including a function of integrating error communication data and resent data of an error page et seq., and when the sender notifies the receiver that error-resending is performed if an error occurs, error-resent data (transmission) is sent without data indicating resending communication. When the sender is notified that the receiver does not have a function of separating data for each communication, including a function of integrating error communication data and resent data of an error page et seq., error-resent data (transmission) is sent with data indicating resending communication. As a receiver, it has a function of causing sorters to separate data for each communication, records only correctly received data of one page, and does not record incompletely received data of one page. The receiver handles error communication and error-resending communication as the same communication (reception), and outputs the data to the same sorter.

FIGS. 12A to 16 show flow charts of the control of the controller 152 in FIG. 11B.

Referring to FIGS. 12A to 16, step S1060 represents a start.

In step S1062, a signal of level "0" is output onto the signal line 152a to turn off a CML.

In step S1064, 1 is set as the bin number of a sorter.

In step S1066, a signal of level "1" is output onto the signal line 152h to instruct the recorder 136 to output the recorded pages to the sorter.

In step S1068, the bin number of the sorter is output onto the signal line 152l to designate the bin of sorter for receiving the recorded pages.

In step S1070, it is checked if reception is selected. If YES in step S1070, the flow advances to step S1076; otherwise, the flow advances to step S1072.

In step S1072, it is checked if transmission is selected. If YES in step S1072, the flow advances to step S1140; otherwise, the flow advances to step S1074.

Step S1074 represents other processes.

In step S1076, a signal of level "1" is output onto the signal line 152a to turn on the CML.

Step S1078 represents a pre-procedure. The sender is notified that the receiver has a function of separating data for each communication, including a function of integrating error communication data and error-resent data. The sender's noticed communication and telephone numbers are stored in the memory 148.

Step S1082 represents storing/recording of an image signal in the memory circuit 132. When data of one page is correctly stored in the memory, the image signal is recorded.

In step S1084, it is checked if a communication error occurs such that no EOL is detected for a predetermined period of time or more in reception of an image signal, no flag is detected for a predetermined period of time or more, no effective frame is detected for a predetermined period of time, or a carrier disconnection for a predetermined period of time or more is detected. If YES in step S1084, the flow advances to step S1114; otherwise, the flow advances to step S1086.

In step S1086, it is checked if reception of one page is ended. If YES in step S1086, the flow advances to step S1092; otherwise, the flow advances to step S1088.

In step S1088, it is checked if recording of one page is ended. If YES in step S1088, the flow advances to step S1090; otherwise, the flow returns to step S1082.

In step S1090, a pulse is generated on the signal line 152m to output the data recorded on the recorder 136 to the designated bin of the sorter.

Step S1092 (FIG. 13) represents an intermediate procedure. Also in step S1092, when data of one page is correctly recorded in the memory, recording is performed.

In step S1094, it is checked if a communication error occurs. If YES in step S1094, the flow advances to step S1114; otherwise, the flow advances to step S1096.

In step S1096, it is checked if a next page is present. If YES in step S1096, the flow returns to step S1082; otherwise, the flow advances to step S1098.

Step S1098 represents a post-procedure. Also in step S1098, when data of one page is correctly stored in the memory, recording is performed.

In step S1102, a signal of level "0" is output onto the signal line 152a to turn off the CML.

Step S1102 represents recording of an image signal.

In step S1104, it is checked if recording of one page is ended. If YES in step S1104, the flow advances to step S1106; otherwise, the flow advances to step S1108.

In step S1106, a pulse is generated onto the signal line 152m to output the data recorded on the recorder 136 to the designated bin of the sorter.

In step S1108, it is checked if data to be recorded is present in data stored in the memory. If YES in step S1108, the flow returns to step S1102; otherwise, the flow advances to step S1110 to prepare for next reception, and the bin number of the sorter is increased by one.

In step S1112, it is checked if the bin number of the sorter is 11. If YES in step S1112, the flow advances to step S1064; otherwise, the flow advances to step S1066.

In step S1114, a signal of level "0" is output onto the signal line 152a to turn off the CML.

Step S1116 (FIG. 4) represents recording pages prior to an error page.

In step S1118, it is checked if recording of one page is ended. If YES in step S1118, the flow advances to step S1120; otherwise, the flow advances to step S1122.

In step S1120, a pulse is generated onto the signal line 152m to output the data recorded on the recorder 136 to the designated bin of the sorter.

In step S1122, it is checked if data to be recorded is present in the memory circuit 132. If YES in step S1122, the flow returns to step S1116; otherwise, the flow advances to step S1124.

In step S1124, it is checked if the sender has a function of resending the error page et seq. If YES in step S1124, the flow advances to step S1126; otherwise, the flow advances to step S1110.

In step S1126, 10 minutes are set in a timer T to accept only error-resent communication by the same sender in 10 minutes.

In step S1128, it is checked if the timer T is time out. If YES in step S1128, the flow advances to step S1110; otherwise, the flow advances to step S1130.

In step S1130, it is checked if reception is selected. If YES in step S1130, the flow advances to step S1132; otherwise, the flow returns to step S1128.

In step S1132, a signal of level "1" is output onto the signal line 152a to turn on the CML.

Step S1134 represents a pre-procedure. The sender is notified that the receiver has a function of separating data for each communication, including a function of integrating error communication data and error-resent data of the error page et seq.

In step S1136 (FIG. 15A), it is checked if the sender intends to resend the error page et.seq. If YES in step S1136, the flow advances to step S1138; otherwise, the flow advances to step S1128.

In step S1138, it is checked if the telephone and communication numbers of the sender accord with those stored in the memory circuit 148. If YES in step S1138, the flow advances to step S1082. If NO or if the data is not notified, the flow returns to step S1128.

In step S1140, the communication number of the sender and the called station are stored in the memory circuit 146.

In step S1142, a signal of level "1" is output onto the signal line 152a to turn on the CML.

Step S1144 represents a pre-procedure. The communication and telephone numbers of the sender are notified to the receiver.

In step S1146, data as to if the receiver has a function of separating resent data for each communication, including a function of integrating error communication data and error-resent data is stored.

Step S1148 represents the remaining pre-procedure. Only when the receiver has the function set forth in step S1146, the sender notifies that it has a function of resending an error page et seq.

Step S1150 represents transmission of an image signal.

In step S1152, it is checked if transmission of one page is ended. If YES in step S1152, the flow advances to step S1154; otherwise, the flow returns to step S1150.

Step S1154 represents an intermediate procedure.

In step S1156, it is checked if a communication error occurs. If YES in step S1154, the flow advances to step S1164; otherwise, the flow advances to step S1158.

In step S1158, it is checked if a next page is present. If YES in step S1158, the flow returns to step S1150; otherwise, the flow advances to step S1160.

Step S1160 represents a post-procedure.

In step S1162, a signal of level "0" is output onto the signal line 152a to turn off the CML.

In step S1164, a signal of level "0" is output onto the signal line 152a to turn off the CML.

Step S1166 represents waiting for two minutes.

Step S1168 (FIG. 6) represents calling of the station registered in the memory circuit 146 by using a calling circuit 151.

In step S1170, a signal of level "1" is output onto the signal line 152a to turn on the CML.

Step S1172 represents a pre-procedure. The receiver is notified that error-resending is performed, in addition to the communication and telephone numbers of the sender registered in the memory circuit 146.

In step S1174, it is checked if the receiver has the function set forth in step S1146. If YES in step S1174, the flow advances to step S1178; otherwise, the flow advances to step S1176.

In step S1176, sending of the image signals of the error page et seq. is started. The first page is sent with data indicating resending communication by using the circuit 112.

In step S1178, sending of the image signals of the error page et seq. is started. In this case, data indicating resending communication is not included.

(Ninth Embodiment)

In the above embodiment, it is assumed that, when an error occurs in reception and the sender has a function of error-resending, communication with another sender is refused. However, when communication with another sender is performed, recorded data may be stored in a sorter such that the bin number is sequentially increased. When error-resending by the sender is performed, the data may be output to the corresponding sorter.

At this time, when communication with another sender is accepted, the timer in step S1126 (FIG. 4) may be stopped, or 10 minutes may be set again.

(Tenth Embodiment)

In the above embodiment, it is assumed that, when an error occurs in reception and the sender has a function of error-resending, communication with another sender is refused. In the ninth embodiment, it is assumed that, when communication with another sender is accepted, the recorded data is stored such that the bin number of the sorter is sequentially increased. When the latter sender also has a function of error-resending, and a communication error occurs, this calling station is also stored. In this case, there are two error communication data stored in sorters. Error-resent data from each sender may be continually output to the corresponding bin number of the sorter.

(Eleventh Embodiment)

In the above embodiment, it is assumed that a facsimile apparatus capable of error-resending redials two minutes after occurrence of a communication error, and that the receiver is not busy. However, if the receiver is busy at this timing, the sender may redial a predetermined number of times.

(Twelfth Embodiment)

In the above embodiment, it is assumed that data for each communication is separated by sorters. However, data for each communication may be separated not by sorters but by a binding means such as a stapler.

Figure 17:
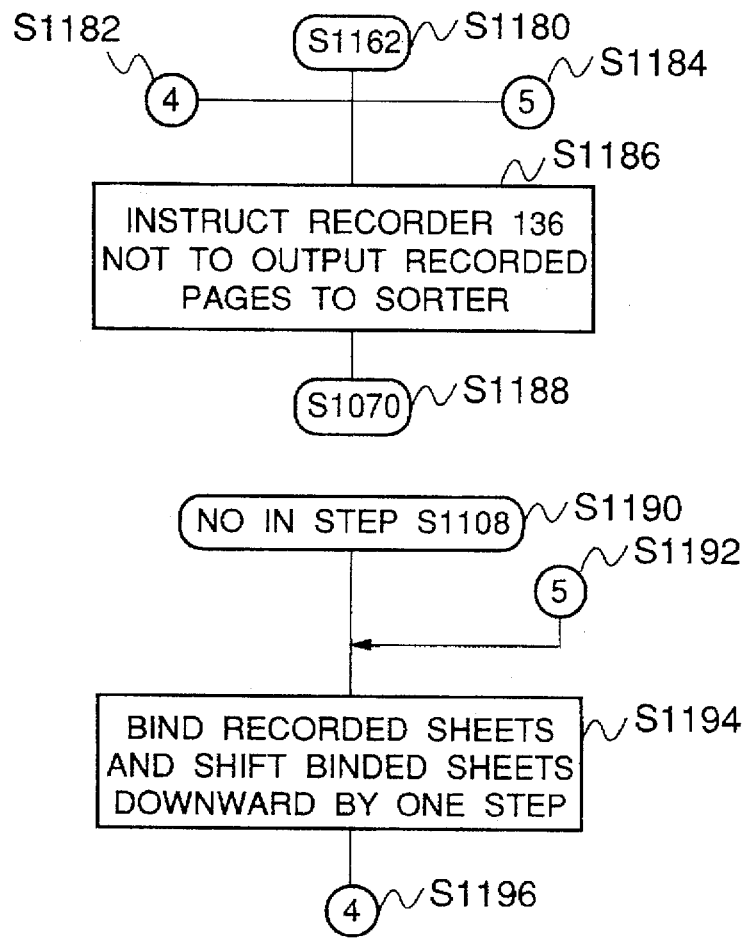
FIG. 17 is a flow chart showing the control steps of the controller 152 in FIG. 11B.

FIG. 17 shows a detailed example of the above control, in which only steps different from those in the control in FIGS. 12A to 16 are shown. However, referring to FIG. 12A and 12B, steps S1090 (FIG. 12B), S1106 (FIG. 13), and S1120 (FIG. 14) are changed to "GENERATE PULSE ONTO SIGNAL LINE 152k TO SHIFT RECORDED DATA DOWNWARD BY ONE STEP".

Referring to FIG. 17, step S1180 represents step S1062 in FIG. 12A, step S1182 represents ④ in FIG. 12A, and step S1184 represents ⑤ in FIG. 12A.

In step S1186, a signal of level "0" is output onto the signal line 152h to instruct the recorder 136 not to output recorded data to the sorter.

Step S1188 represents step S1070 in FIG. 12A.

Figure 13:
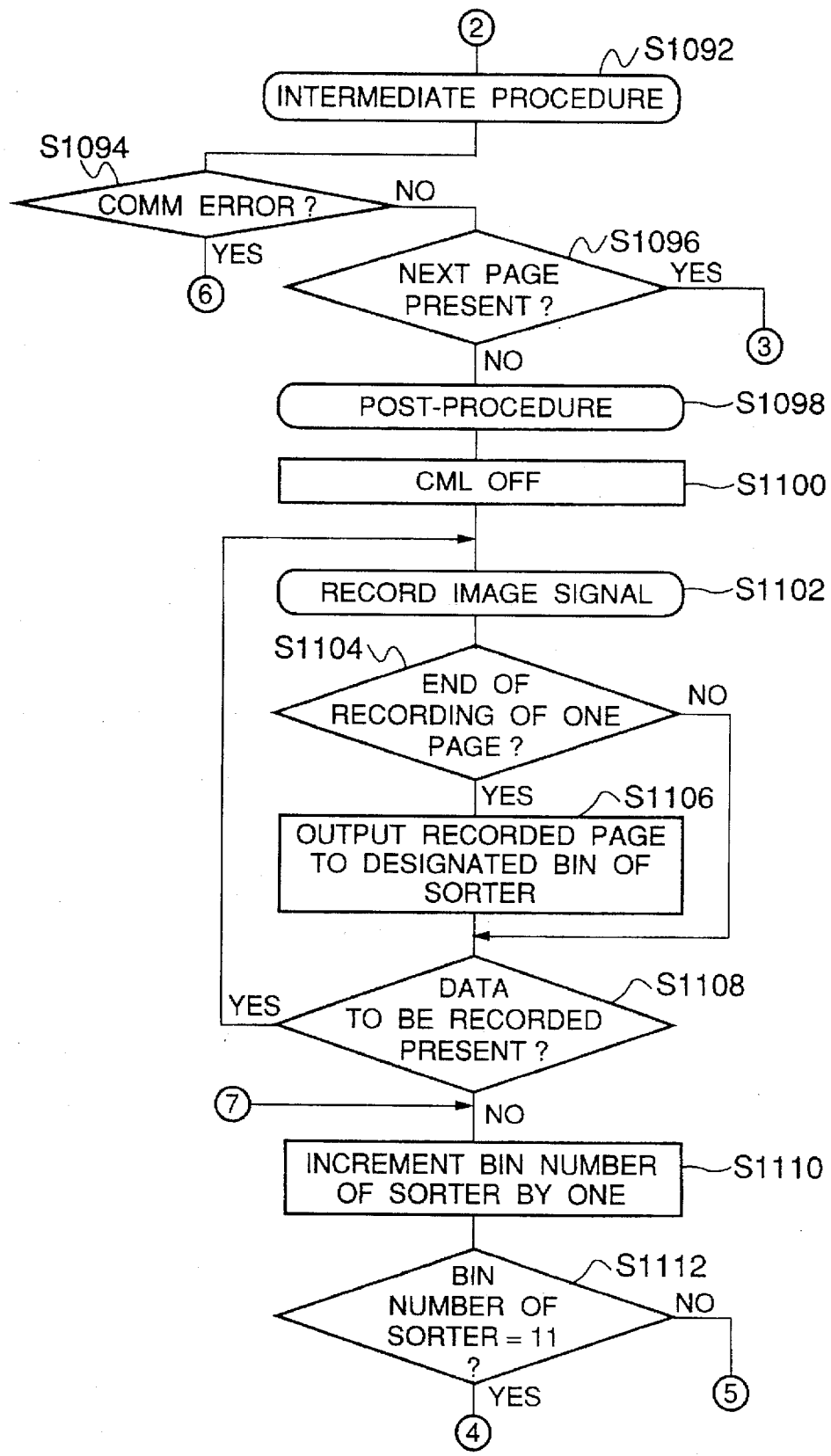
FIG. 13 is a flow chart showing the control steps of the controller 152 in FIG. 11B.

Step S1190 represents NO in step S1108 in FIG. 13, and step S1192 represents ⑦ in FIG. 13.

In step S1194, a bind pulse is generated onto the signal line 152i to bind the recorded sheets stacked downward by one step of the recorder 136. The bound data is shifted downward by one more step.

Step S1196 represents ④ in FIG. 12A.

(Thirteenth Embodiment)

In the above embodiment, it is assumed that data is recorded on a cut paper sheet. However, in this embodiment, it is assumed that data is recorded on roll paper. A cutting operation is performed for each communication.

Figure 18:
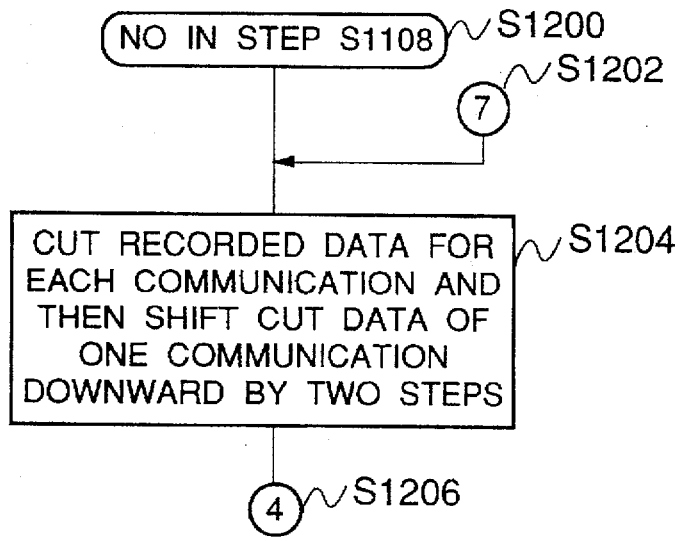
FIG. 18 is a flow chart showing the control steps of the controller 152 in FIG. 11B.

FIG. 18 shows a detailed example of the above control, in which only steps different from those in the control in FIG. 17 are shown. Others are the same as in the twelfth embodiment.

However, steps S1090 (FIG. 12B), S1106 (FIG. 13), and S1120 (FIG. 14) are omitted.

Step S1200 represents NO in step S1108, and step S1202 represents ⑦ in FIG. 13.

In step S1204, a cut instruct pulse is generated onto the signal line 152j to perform a cutting operation for each communication. Upon completion of the cutting operation, data for each communication is shifted downward by two steps.

Step S1206 represents ④ in FIG. 12A.

(Fourteenth Embodiment)

In the above embodiment, it is assumed that the receiver has a memory means for storing data of one page or more, incompletely received data of one page is not recorded, and data is recorded when data of one page is correctly stored in the memory. In this embodiment, it is assumed that the receiver has no memory for storing one page, and in real-time recording, incompletely received data of one page is shifted to another place. In the fourteenth embodiment, separation by sorters is assumed, and in the fifteenth embodiment, separation by a binding means is assumed.

Figure 19:
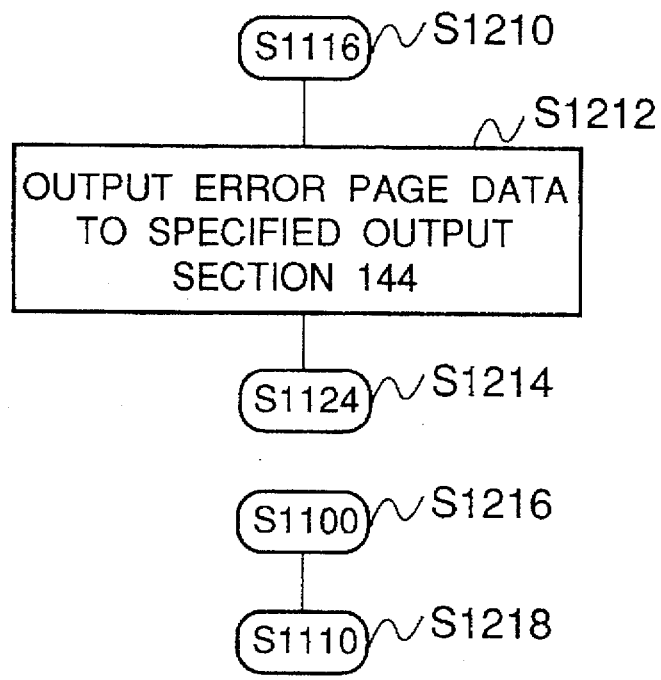
FIG. 19 is a flow chart showing the control steps of the controller 152 in FIG. 11B.

FIG. 19 shows a detailed example of separation by sorters, in which only steps different from those in the control in FIGS. 12A to 16 are shown.

However, step S1082 represents control for sequentially recording data in real time. Recording control in steps S1092 (FIG. 13) and S1098 (FIG. 13) is omitted.

Figure 12B:
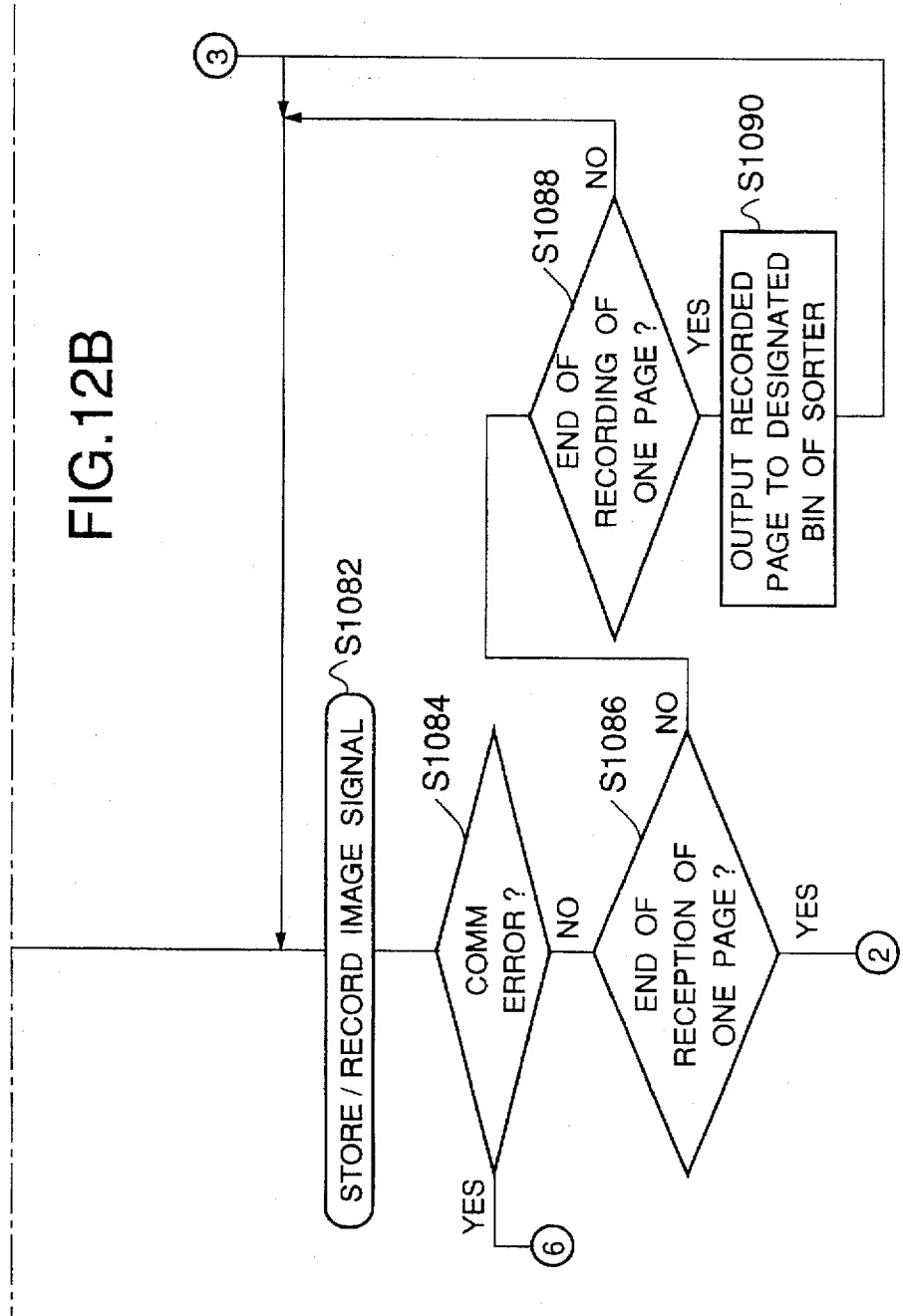
FIG. 12 is comprised of FIGS. 12A and 12B showing flow charts of the control steps of a controller 152 in FIG. 11B.

The recorded data is shifted downward by one step after recording of data of one page in step S1088 (FIG. 12B) and step S1090 (FIG. 12B). However, in this embodiment, the recorded data is shifted after reception of one page because of real-time recording. More specifically, the data is shifted after YES in step S1086 (FIG. 12B).

Figure 14:
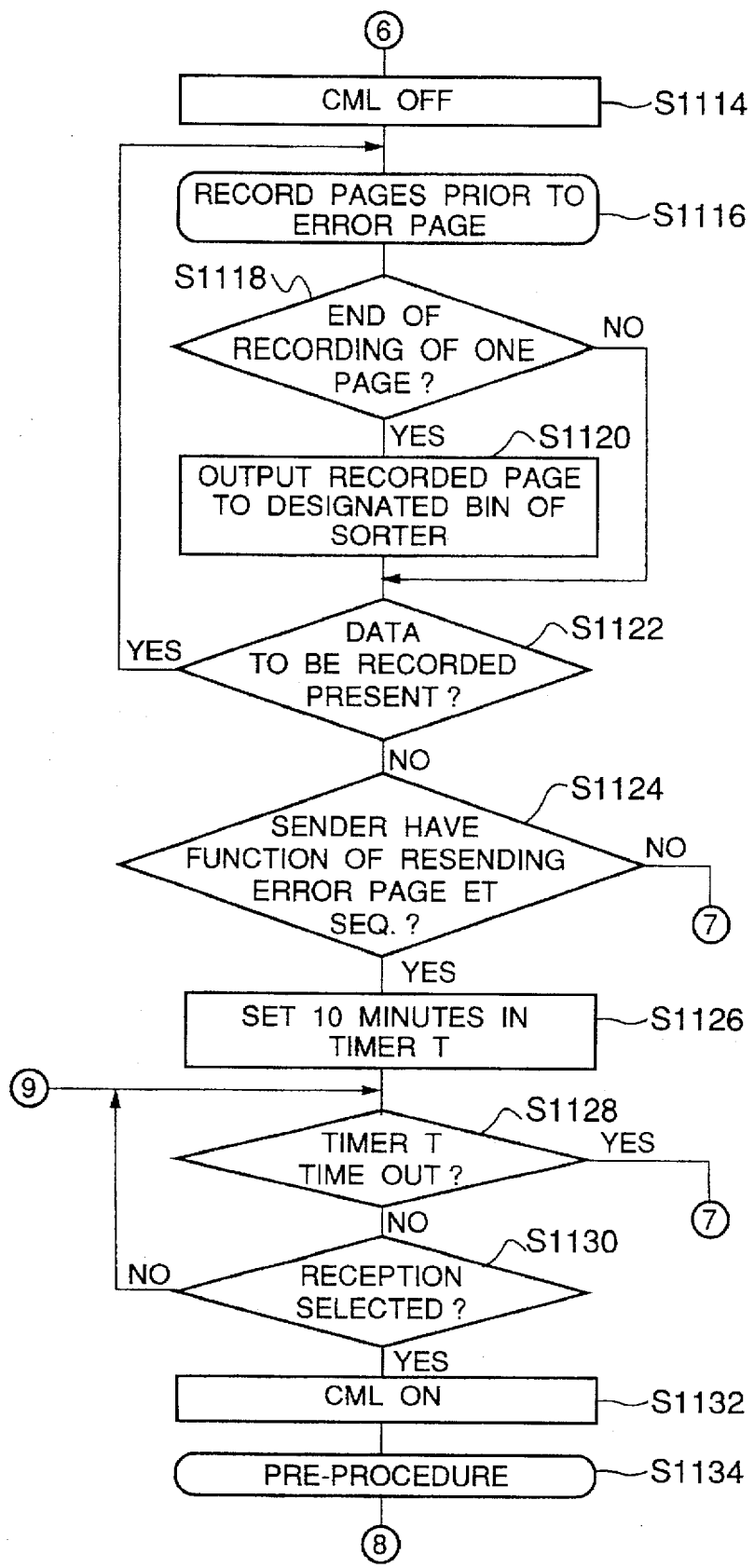
FIG. 14 is a flow chart showing the control of the controller 152 in FIG. 11B.
Figure 16:
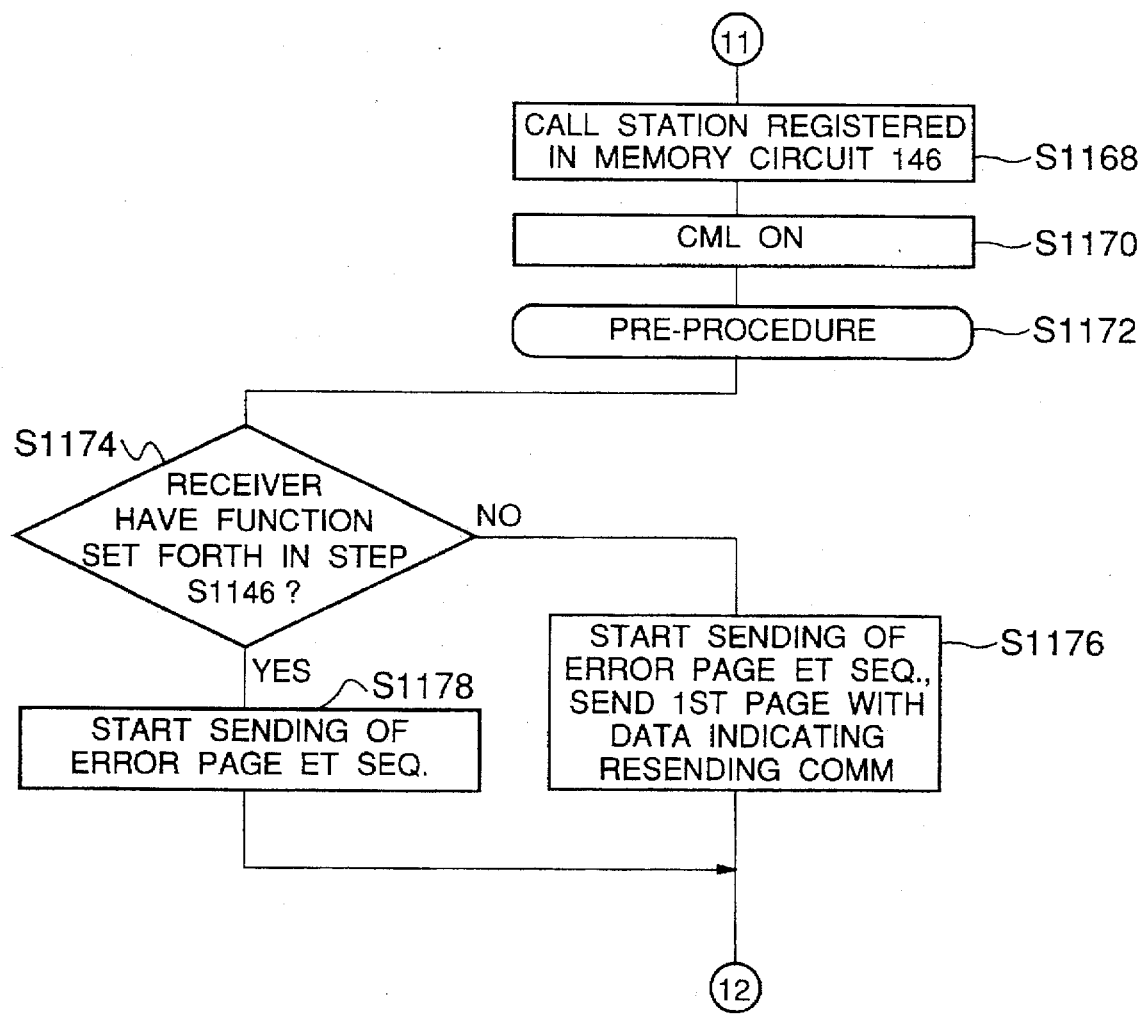
FIG. 16 is a flow chart showing the control steps of the controller 152 in FIG. 11B.

Step S1210 represents step S1116 in FIG. 14.

In step S1212, a pulse is generated onto the signal line 152n to output the error data presently recorded to the specified output section 144 from the recorder 136.

Step S1214 represents step S1124 in FIG. 14, step S1216 represents step S1100 in FIG. 13, and step S1218 represents step S110 in FIG. 13.

(Fifteenth Embodiment)

Separation by a binding means such as a stapler in real-time recording will be described below.

Figure 20:
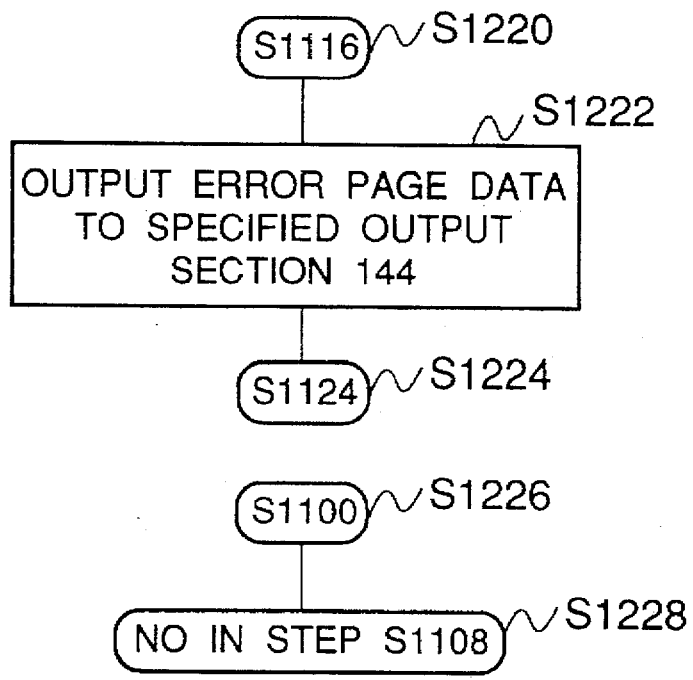
FIG. 20 is a flow chart showing the control steps of the controller 152 in FIG. 11B.

FIG. 20 shows a detailed example of separation by a binding means, in which only steps different from those in the control in FIG. 17 are shown. Others are the same as in the twelfth embodiment.

However, step S1082 (FIG. 12B) represents control for sequentially recording data in real time. Recording control in steps S1092 (FIG. 13) and S1098 (FIG. 13) is omitted. The recorded data is shifted downward by one step after recording of data of one page in step S1088 (FIG. 12B) and step S1090 (FIG. 12B). However, in this embodiment, the recorded data is shifted after reception of one page because of real-time recording. More specifically, the data is shifted after YES in step S1086 (FIG. 12B).

Step S1220 represents step S1116 in FIG. 14.

In step S1222, a pulse is generated onto the signal line 152n to output the data presently recorded to the specified output section 144 from the recorder 136.

Step S1224 represents step S1124 in FIG. 14, step S1226 represents step S1100 in FIG. 13, and step S1228 represents NO in step S1108 in FIG. 13.

(Sixteenth Embodiment)

In the above embodiment, error communication and error-resending are separately output to a communication result report or the like. For error-resending, data indicating error-resending is output.

These reports are composed by the circuit 150. An example of the reports is shown in FIG. 21.

Referring to FIG. 21, communication with a communication number 1013 is terminated with an error. The communication number of error-resending is 1014. It is indicated that communication with the number 1014 is error-resending of the communication 1013, and the communication result is good.

In not only reception but also transmission of an error page et seq., a communication result report with data indicating error-resending is output.

As has been described above, according to the present invention, when the receiver has a function of separating data for each communication, and error-resending is performed, these two communications (reception) are handled as one communication. For this reason, data for one communication can be bound or cut to output the data to the same bin number of the sorter, so that the user can exactly separate data for each communication. In addition, when these functions are effectively used, error-resent data is sent without data indicating error-resending, so that the user can obtain data as in communication without an error. When these functions are not effectively used, error-resent data is sent with data indicating error-resending, so that the operator of the receiver can recognize error-resending.

In real-time recording of the received data, data of an error page can be deleted.

What is claimed is:

1. A data communication apparatus comprising:

receiving means for receiving a plurality of communication data sent from respective sending parties, each communication data including at least process data to be processed, party information identifying the respective sending party and communication information identifying the process data;

memory means for storing at least the party information and communication information of first communication data received by said receiving means at a first time;

managing means, responsive to reception by said receiving means of second communication data at a second time later than the first time, for determining a relationship between the process data of the first communication data and the process data of the second communication data based on the respective party and communication information of the first and second communication data; and processing means for processing the process data of the first communication data and the process data of the second communication data, on the basis of the relationship determined by said managing means.

2. A data communication apparatus according to claim 1, wherein each communication data is received from a respective sending party in a separate communication procedure.

3. An apparatus according to claim 2, wherein the first communication data is data already received before occurrence of an error during a communication pertinent to the error, and the second communication data is data not received yet after the occurrence of the error during the communication pertinent to the error.

4. An apparatus according to claim 2, further comprising combining means for combining first process data and second output data on the basis on the relationship outputted by said managing means.

5. A data communication apparatus according to claim 2, wherein said managing means determines the relationship based on whether or not the respective party information of the first and second communication data indicate that the respective sending parties are the same.

6. A data communication apparatus according to claim 5, wherein said managing means further determines the relationship based on whether the respective communication information of the first and second communication data indicate that the respective data thereof are parts of a single document.

7. A data communication apparatus according to claim 2, wherein said memory means stores the party and communication information of the first communication data when the communication procedure thereof is interrupted.

8. An apparatus according to claim 1, further comprising recording means for recording the process data on a recording sheet.

9. An apparatus according to claim 1, further comprising storing means for storing the process data, wherein said processing means causes said storing means to store the process data therein.

10. An apparatus according to claim 1, wherein the process data is image data.

11. An apparatus according to claim 1, wherein said data communication apparatus is a facsimile apparatus.

12. A data communication method comprising the steps of:

receiving a plurality of communication data sent from respective sending parties, each communication data including at least process data to be processed, party information identifying the respective sending party and communication information identifying the process data;

storing at least the party information and communication information of first communication data received by said receiving step at a first time;

managing, responsive to reception by said receiving means of second communication data at a second time later than the first time, for determining a relationship between the process data of the first communication data and the process data of the second communication data based on the respective party and communication information of the first and second communication data; and processing the process data of the first communication data and the process data of the second communication data, on the basis of the relationship determined by said managing step.

13. A data communication method according to claim 12, wherein each communication data is received from a respective sending party in a separate communication procedure.

14. A data communication method according to claim 13, wherein said managing step determines the relationship based on whether or not the respective party information of the first and second communication data indicate that the respective sending parties are the same.

15. A data communication method according to claim 14, wherein said managing step further determines the relationship based on whether the respective communication information of the first and second communication data indicate that the respective data thereof are parts of a single document.

16. A data communication method according to claim 13, wherein said storing step stores the party and communication information of the first communication data when the communication procedure thereof is interrupted.

17. A method according to claim 13, wherein the first communication data is data already received before occurrence of an error during a communication pertinent to the error, and the second communication data is data not received yet after the occurrence of the error during the communication pertinent to the error.

18. A method according to claim 13, further comprising a combining step for combining first process data and second process data on the basis on the relationship outputted by said managing step.

19. A method according to claim 12, further comprising a recording step of recording the process data on a recording sheet.

20. A method according to claim 12, further comprising a storing step of storing the process data, wherein said processing step causes said storing step to store the process data.

21. A method according to claim 12, wherein the process data is image data.

22. A method according to claim 12, wherein said data communication method is performed by a facsimile apparatus.

23. A facsimile apparatus comprising:

receiving means for receiving first data sent at a first time by a first sending party and second data sent at a second time later than the first time from a second sending party;

managing means for managing first and second party information, identifying the first and second sending parties, included in the first and second data, respectively, for determining a relationship between the first data and the second data based on the first and second party information, and outputting an instruction if the relationship is determined;

sorting means for sorting the first data and the second data; and combining means for combining the first data and the second data based on the instruction output by said managing means.

24. A facsimile apparatus according to claim 23, wherein said sorting means is a mechanical sorting means, and the first data and the second data are sorted and combined as a single set of data in accordance with the instruction from the managing means.

25. An apparatus according to claim 24, further comprising recording means for recording the data on a recording sheet, wherein said combining means discharges the recording sheet on which the first data is recorded and the recording sheet on which the second data is recorded, to one bin of said sorting means.

26. An apparatus according to claim 23, wherein the first communication data is data already received before occurrence of an error during a communication pertinent to the error, and the second communication data is data not received yet after the occurrence of the error during the communication pertinent to the error.

27. A facsimile method comprising the steps of:

receiving first data sent at a first time by a first sending party and second data sent at a second time later than the first time from a second sending party;

managing first and second party information, identifying the first and second sending parties, included in the first and second data, respectively, determining a relationship between the first data and the second data based on the first and second party information, and outputting an instruction if the relationship is determined;

sorting the first data and the second data; and combining the first data and the second data based on the instruction output by said managing step.

28. A facsimile method according to claim 27, wherein said sorting step uses a mechanical sorting means, and the first data and the second data are sorted and combined as a single set of data in accordance with the instruction from the managing step.

29. A facsimile method according to claim 28, wherein the first communication data is data already received before occurrence of an error during a communication pertinent to the error, and the second communication data is data not received yet after the occurrence of the error during the communication pertinent to the error.

30. A method according to claim 28, further comprising a recording step of recording the data on a recording sheet, wherein said combining step discharges the recording sheet on which the first data is recorded and the recording sheet on which the second data is recorded, to one bin of said mechanical sorting means.

* * * * *

UNITED STATES PATENT AND TRADEMARK OFFICE
CERTIFICATE OF CORRECTION

PATENT NO. : 5,684,606

DATED : November 4, 1997

INVENTOR(S): TAKEHIRO YOSHIDA

It is certified that error appears in the above-identified patent and that said Letters Patent is hereby corrected as shown below:

COLUMN 6

Line 27, "She" should read --the--.

COLUMN 9

Line 60, "102b, When" should read --102b. When--.

COLUMN 19

Line 50, "on" (second occurrence) should read --of--.

Signed and Sealed this

Sixteenth Day of June, 1998

Attest:

BRUCE LEHMAN

*Attesting Officer*      *Commissioner of Patents and Trademarks*